(12) United States Patent
Kim et al.

(10) Patent No.: US 11,238,871 B2
(45) Date of Patent: Feb. 1, 2022

(54) ELECTRONIC DEVICE AND CONTROL METHOD THEREOF

(71) Applicant: Samsung Electronics Co., Ltd., Suwon-si (KR)

(72) Inventors: Chanwoo Kim, Suwon-si (KR); Kyungmin Lee, Suwon-si (KR); Jaeyoung Roh, Suwon-si (KR); Donghan Jang, Suwon-si (KR); Keunseok Cho, Suwon-si (KR); Jiwon Hyung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 16/665,532

(22) Filed: Oct. 28, 2019

(65) Prior Publication Data

US 2020/0135213 A1    Apr. 30, 2020

(30) Foreign Application Priority Data

Oct. 29, 2018 (KR) .................. KR10-2018-0130007

(51) Int. Cl.
*G10L 17/24* (2013.01)
*G06F 21/32* (2013.01)
(Continued)

(52) U.S. Cl.
CPC .............. *G10L 17/24* (2013.01); *G06F 21/32* (2013.01); *G10L 17/00* (2013.01); *G10L 17/04* (2013.01)

(58) Field of Classification Search
CPC ......... G10L 17/24; G10L 17/00; G10L 17/04; G10L 2015/223; G10L 15/22; G06F 21/32; G06F 3/167; G06F 3/01; G06F 3/16
See application file for complete search history.

(56) References Cited

U.S. PATENT DOCUMENTS 7,493,257 B2  2/2009  Kim et al.
8,279,171 B2  10/2012 Hirai et al.
(Continued)

FOREIGN PATENT DOCUMENTS

JP   2000-067004 A    3/2000
KR   10-2003-0001669 A  1/2003
(Continued)

OTHER PUBLICATIONS

International Search Report with Written Opinion dated Feb. 18, 2020; International Appln. No. PCT/KR2019/014292.

*Primary Examiner* — Huyen X Vo
(74) *Attorney, Agent, or Firm* — Jefferson IP Law, LLP

(57) ABSTRACT

An electronic apparatus and a control method are provided, including an input interface, a communication interface, a memory including at least one command, and at least one processor configured to control the electronic device and execute the at least one command to receive a user speech through the input interface, determine whether or not the user speech is a speech related to a task requiring user confirmation by analyzing the user speech, generate a question for the user confirmation when it is determined that the user speech is the speech related to the task requiring the user confirmation, and perform a task corresponding to the user speech when a user response corresponding to the question is input through the input interface. Embodiments may use an artificial intelligence model learned according to at least one of machine learning, a neural network, and a deep learning algorithm.

14 Claims, 16 Drawing Sheets

(51) Int. Cl.
    *G10L 17/04*         (2013.01)
    *G10L 17/00*         (2013.01)

(56) References Cited

U.S. PATENT DOCUMENTS

| | | |
|---|---|---|
| 9,424,840 B1 * | 8/2016 | Hart ................ G10L 15/22 |
| 2006/0271364 A1 | 11/2006 | Mirkovic et al. |
| 2006/0293898 A1 | 12/2006 | Ollason |
| 2007/0118384 A1 | 5/2007 | Gustafson |
| 2011/0125503 A1 * | 5/2011 | Dong ............... G10L 21/0216 |
| | | 704/275 |
| 2012/0216260 A1 | 8/2012 | Crawford et al. |
| 2014/0365226 A1 * | 12/2014 | Sinha ................ G10L 15/22 |
| | | 704/275 |
| 2014/0379340 A1 * | 12/2014 | Timem ............... H04L 63/102 |
| | | 704/246 |
| 2017/0116986 A1 * | 4/2017 | Weng ................ G10L 15/22 |
| 2018/0082052 A1 * | 3/2018 | Swart ................ H04L 63/102 |
| 2018/0308501 A1 * | 10/2018 | Johnson ............. G10L 17/06 |
| 2019/0043507 A1 * | 2/2019 | Huang ............... G10L 17/00 |

FOREIGN PATENT DOCUMENTS

| | | |
|---|---|---|
| KR | 10-2008-0066394 A | 7/2008 |
| KR | 10-1515172 B1 | 4/2015 |
| KR | 10-1812022 B1 | 12/2017 |
| WO | 2005/119653 A1 | 12/2005 |
| WO | 2016/140930 A1 | 9/2016 |

\* cited by examiner

ELECTRONIC DEVICE AND CONTROL METHOD THEREOF

CROSS-REFERENCE TO RELATED APPLICATION(S)

This application is based on and claims priority under 35 U.S.C. § 119(a) of a Korean patent application number 10-2018-0130007, filed on Oct. 29, 2018, in the Korean Intellectual Property Office, the disclosure of which is incorporated by reference herein in its entirety.

BACKGROUND

1. Field

The disclosure relates to an electronic device and a control method thereof. More particularly, the disclosure relates to an electronic device providing a question for user confirmation to perform a task corresponding to a user speech, and a control method thereof.

2. Description of the Related Art

Recently, an artificial intelligence system has been used in various fields. The artificial intelligence system is a system in which a machine performs learning and decision making, and becomes smart by itself unlike an existing rule-based smart system. As the artificial intelligence system is used more often, a recognition rate is improved and a user's preferences may be more accurately understood. Therefore, the existing rule-based smart system has been gradually replaced by a deep learning-based artificial intelligence system.

Such an artificial intelligence technology typically consists of machine learning (for example, deep learning) and element technologies using the machine learning. The machine learning is an algorithm technology of classifying/learning features of input data by itself, and the element technology is a technology of simulating functions such as recognition, decision, and the like, of a human brain using a machine learning algorithm such as deep learning, or the like, and consists of technical fields such as linguistic understanding, visual understanding, inference/prediction, knowledge representation, motion control, and the like.

Various fields to which the artificial intelligence technology is applied are as follows. Linguistic understanding is a technology of recognizing and applying/processing human languages/characters, and includes natural language processing, machine translation, a dialogue system, question and answer, speech recognition/synthesis, and the like. Visual understanding is a technology of recognizing and processing things like human vision, and includes object recognition, object tracking, image search, human recognition, scene understanding, space understanding, image improvement, and the like. Inference/prediction is a technology of deciding and logically inferring and predicting information, and includes knowledge/probability-based inference, optimization prediction, preference-based planning, recommendation, and the like. Knowledge representation is a technology of automating and processing human experience information as knowledge data, and includes knowledge construction (data creation/classification), knowledge management (data utilization), and the like. Motion control is a technology of controlling self-driving of a vehicle and a motion of a robot, and includes a motion control (navigation, collision, driving), a manipulation control (behavior control), and the like.

Recently, electronic devices have also been configured to perform various tasks using user speech. For example, the electronic device may perform various tasks such as a message transmission task, an email transmission task, a remittance task, an external device control task, a product purchase task, a content reproduction task, and the like, through the user speech.

The electronic device may perform the various tasks through the user speech, but there is a problem in that the electronic device may perform a task unintended by a user through a user speech unintended by the user or a speech uttered from other than the user. As an example, the electronic device performs the task unintended by the user through a speech uttered by the user during a dialogue with another user or a speech output from an external device such as a television (TV).

Particularly, in a case in which the speech unintended by the user is a speech for performing a task related to user privacy or user security, the electronic device performs a wrong task through the speech unintended by the user to cause a problem such as invasion of privacy or vulnerability of security. Therefore, a method for preventing the task from being performed through the speech unintended by the user is required.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least advantages described below. Accordingly, an aspect of the disclosure is to provide an apparatus and method for providing a question for user confirmation to perform a task corresponding to a user speech, and a control method thereof.

Another aspect of the disclosure is to provide an electronic device capable of determining whether or not a task related to a user speech is a task requiring user confirmation and generating and providing a question for the user confirmation on the basis of a determination result, and a control method thereof.

Additional aspects will be set forth in part in the description which follows and, in part, will be apparent from the description, or may be learned by practice of the presented embodiments.

In accordance with an aspect of the disclosure, an electronic device is provided. The electronic device includes an input interface, a communication interface, a memory including at least one command instruction, and at least one processor connected to the input interface, the communication interface, and the memory and configured to control the electronic device, wherein the at least one processor executes the at least one command to be configured to receive a user speech through the input interface, determine whether or not the user speech is a speech related to a task requiring user confirmation by analyzing the user speech, generate a question for the user confirmation when it is determined that the user speech is the speech related to the task requiring the user confirmation, and perform a task corresponding to the user speech when a user response corresponding to the question is input through the input interface.

In accordance with another aspect of the disclosure, a control method of an electronic device is provided. The control method includes receiving a user speech, determining whether or not the user speech is a speech related to a task requiring user confirmation by analyzing the user speech, generating a question for the user confirmation when it is determined that the user speech is the speech related to the task requiring the user confirmation, and performing a task corresponding to the user speech when a user response corresponding to the question is input.

According to the embodiments described above, even when a speech unintended by a user is input to the electronic device, user confirmation for performing a task is performed, such that the user may protect privacy and enhance security.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and/or other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
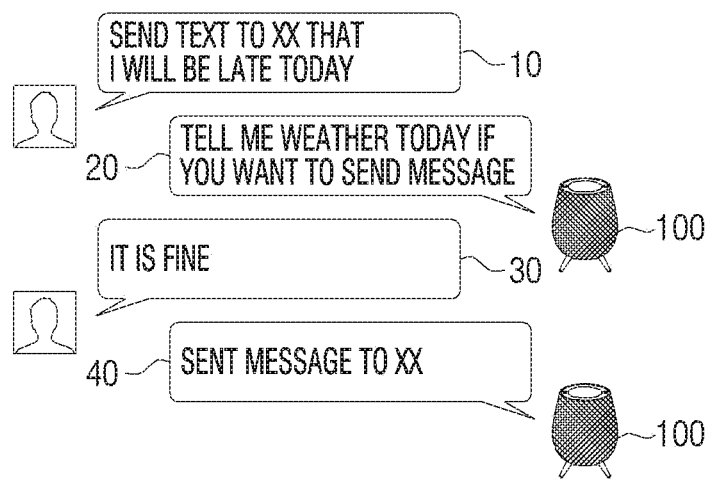
FIG. 1 is a use diagram of an electronic device performing a task in response to a user speech according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, an expression "have", "may have", "include", "may include", or the like, indicates existence of a corresponding feature (for example, a numerical value, a function, an operation, a component such as a part, or the like), and does not exclude existence of an additional feature.

In the disclosure, an expression "A or B", "at least one of A and/or B", "one or more of A and/or B", or the like, may include all possible combinations of items enumerated together. For example, "A or B", "at least one of A and B", or "at least one of A or B" may indicate all of 1) a case in which at least one A is included, 2) a case in which at least one B is included, or 3) a case in which both of at least one A and at least one B are included.

Expressions "first", "second", or the like, used in the disclosure may indicate various components regardless of a sequence and/or importance of the components, will be used only to distinguish one component from the other components, and do not limit the corresponding components.

When it is mentioned that any component (for example, a first component) is (operatively or communicatively) coupled to or is connected to another component (for example, a second component), it is to be understood that any component is directly coupled to another component or may be coupled to another component through the other component (for example, a third component). When it is mentioned that any component (for example, a first component) is "directly coupled" or "directly connected" to another component (for example, a second component), it is to be understood that the other component (for example, a third component) is not present between any component and another component.

An expression "configured (or set) to" used in the disclosure may be replaced by an expression "suitable for", "having the capacity to" "designed to", "adapted to", "made to", or "capable of" depending on a situation. A term "configured (or set) to" may not necessarily mean "specifically designed to" in hardware. Instead, an expression "a device configured to" may mean that the device may "do" together with other devices or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory device.

Electronic devices according to diverse embodiments of the disclosure may include at least one of, for example, a smartphone, a tablet personal computer (PC), a mobile phone, a video phone, an e-book reader, a desktop PC, a laptop PC, a netbook computer, a workstation, a server, a personal digital assistants (PDA), a portable multimedia player (PMP), an MP3 player, a medical device, a camera, or a wearable device. The wearable device may include at least one of an accessory type wearable device (for example, a watch, a ring, a bracelet, an anklet, a necklace, a glasses, a contact lens, or a head-mounted-device (HMD), a textile or clothing integral type wearable device (for example, an electronic clothing), a body attachment type wearable device (for example, a skin pad or a tattoo), and a living body implantation type wearable device. In some embodiments, the electronic device may include at least one of, for example, a television (TV), a digital video disk (DVD) player, an audio player, a refrigerator, an air conditioner, a cleaner, an oven, a microwave oven, a washing machine, an air cleaner, a set-top box, a home automation control panel, a security control panel, a media box (for example, Home-Sync™ of Samsung Electronics Co., Ltd, TV™ of Apple Inc, or TV™ of Google), a game console (for example Xbox™, PlayStation™), an electronic dictionary, an electronic key, a camcorder, or a digital photo frame.

In other embodiments, the electronic device may include at least one of various medical devices (for example, various portable medical measuring devices (such as a blood glucose meter, a heart rate meter, a blood pressure meter, a body temperature meter, or the like), a magnetic resonance angiography (MRA), a magnetic resonance imaging (MRI), a computed tomography (CT), a photographing device, an ultrasonic device, or the like), a navigation device, a global navigation satellite system (GNSS), an event data recorder (EDR), a flight data recorder (FDR), an automobile infotainment device, a marine electronic equipment (for example, a marine navigation device, a gyro compass, or the like), avionics, a security device, an automobile head unit, an industrial or household robot, a drone, an automatic teller's machine (ATM) of a financial institute, a point of sales (POS) of a shop, or Internet of things (IoT) devices (for example, a light bulb, various sensors, a sprinkler system, a fire alarm, a thermostat, a street light, a toaster, an exercise equipment, a hot water tank, a heater, a boiler, and the like).

In the disclosure, a term "user" may refer to a person using an electronic device or a device (for example, an artificial intelligence electronic device) using an electronic device.

Hereinafter, the disclosure will be described in detail with reference to the accompanying drawings.

FIG. 1 is a use diagram of an electronic device performing a task depending on a user speech according to an embodiment of the disclosure.

Referring to FIG. 1, an electronic device 100 may receive a trigger speech for activating an artificial intelligence agent program. As an example, the trigger speech may include a trigger word such as "Bixby", "Siri", or the like. In this case, the artificial intelligence agent program may include a dialogue system that may process and provide a response to a user speech as a natural language and perform a task for the user speech. In this case, the electronic device 100 may receive the user speech after a specific button provided in the electronic device 100 is selected, in addition to the trigger word for activating the artificial intelligence agent program. The electronic device 100 may activate the artificial intelligence agent program in response to the trigger speech.

The electronic device 100 may receive the user speech after the artificial intelligence agent program is activated. In this case, the user speech may be a speech for performing a specific task.

As an example, as illustrated in FIG. 1, the electronic device 100 may obtain a user speech 10 "send a text to XX that I will be late today".

The electronic device 100 may analyze the user speech to determine (identify) whether or not the user speech is a user speech related to a task requiring user confirmation. In detail, the electronic device 100 may obtain a text for the user speech 10 through an automatic speech recognition module and determine (identify) whether or the user speech is the user speech related to the task requiring the user confirmation on the basis of the obtained text.

As an embodiment, the electronic device 100 may determine (identify) whether or not the obtained user speech is a user speech for performing a predetermined task (for example, a remittance task, a product purchase task, an email transmission task, a message transmission task, a telephone call task, or the like) related to user privacy or requiring an authentication procedure. That is, the electronic device 100 may determine (identify) whether or not the user speech corresponds to the task related to the user privacy or requiring the authentication procedure to determine (identify) whether or not the user speech is the user speech related to the task requiring the user confirmation.

As another example, the electronic device 100 may identify a task related to the user speech and an entity for performing the task on the basis of the text obtained on the basis of the user speech. In addition, the electronic device 100 may obtain a security score of the user speech on the basis of the identified task and entity, and determine whether or not the user speech is the user speech related to the task requiring the user confirmation on the basis of the security score of the user speech. Here, in a case in which the security score is a predetermined value or more, the electronic device 100 may determine that the user speech is the user speech related to the task requiring the user confirmation.

When it is determined that the user speech is the user speech related to the task requiring the user confirmation, the electronic device 100 may generate (obtain) the question for the user confirmation. In this case, the electronic device 100 may generate (obtain) a question that is not related to the user speech. As an example, the electronic device 100 may generate (obtain) a question 20 "tell me the weather today if you want to send a message" that is not related to a message transmission task at all, as illustrated in FIG. 1.

As an embodiment, the electronic device 100 may generate (obtain) the question for the user confirmation on the basis of the security score. In detail, as the security score becomes high, the electronic device 100 may generate (obtain) a question having a low relevance to the task corresponding to the user speech. That is, the electronic device 100 may generate (obtain) a question that is not related to a current question. In addition, as the security score becomes low, the electronic device 100 may generate (obtain) a question having a high relevance to the task corresponding to the user speech. As an example, the electronic device 100 may extract at least one text related to the task among texts included in the user speech and generate (obtain) a question for inducing user utterance for the extracted at least one text.

In addition, when the security score is a threshold value or more, the electronic device 100 may provide an authentication message for user authentication as well as the user confirmation. As an example, the electronic device 100 may provide the authentication message for the user authentication on the basis of pre-registered user information. In this case, a question demanding at least one information may be included in the authentication message. For example, a question that may demand user information to request authentication may be included in the authentication message, and a question that may additionally demand at least one information in addition to the user information to request authentication may be included in the authentication message. As an example, the electronic device 100 may provide an authentication message including a question demanding utterance of a specific word including the user information for the purpose of the user authentication, and may provide an authentication message further including a message requesting dragging of a specific shape (for example, a straight line, a star shape or the like) on a display or requesting biological information authentication (for example, a fingerprint, iris or the like), in addition to the question demanding the utterance of the specific word including the user information.

As another example, the electronic device 100 may analyze a speech of a user using the electronic device 100 at ordinary times to obtain speech feature information on a text distinguished from that of another user and store the speech feature information in a memory. In addition, when it is determined that the user speech is the speech related to the task requiring the user confirmation, the electronic device 100 may generate a question including the stored text for the purpose of the user authentication.

According to another embodiment, the electronic device 100 may randomly select and generate one of a plurality of questions that are stored.

According to still another embodiment, the electronic device 100 may display a plurality of objects through a display and generate a question demanding selection of one of the plurality of objects.

According to still another embodiment, the electronic device 100 may generate a question on the basis of a situation around the electronic device 100. In detail, the electronic device 100 may determine a place (for example, a home, a vehicle, a public place, or the like) where the electronic device 100 is positioned by various methods. As an example, the electronic device 100 may determine a place where the electronic device 100 is positioned on the basis of network information connected to the electronic device 100, global positioning system (GPS) information, information on an external device connected to the electronic device 100, and the like. Alternatively, the electronic device 100 may determine a place where the electronic device 100 is positioned or whether or not a person is present around the electronic device 100 on the basis of external noise acquired through a microphone, an environmental noise vector, whether or not there is a dialogue with the surrounding person, and the like. When it is determined that the electronic device 100 is positioned at a home or that a person is not present around the electronic device 100, the electronic device 100 may generate a question including personal information. However, when it is determined that the electronic device 100 is positioned at the outside or that a person is present around the electronic device 100, the electronic device 100 may generate a question that does not include personal information.

According to still another embodiment, in a case in which the security score may not be calculated or the security score calculated in the electronic device 100 is within a threshold value range, the electronic device 100 may calculate a more accurate security score through a learned artificial intelligence model provided in an external server. In this case, the learned artificial intelligence model, which is an artificial intelligence model learned on the basis of user speeches and security scores input to various electronic devices 100, may calculate a more accurate security score as compared with a method of calculating the security score included in the electronic device 100.

When the question is generated, the electronic device 100 may output the generated question 20. In this case, the electronic device 100 may output the generated question in a natural language form through a natural language generation module.

The electronic device 100 may receive a user response to the question. As an example, the electronic device 100 may receive a user response 30 "it is fine", as illustrated in FIG. 1.

The electronic device 100 may determine whether or not the user response is a user response corresponding to the question. As an example, in a case in which the question is the question demanding the user information, the electronic device 100 may determine whether or not accurate user information is included in the user response, in a case in which the question is the question demanding the utterance of the specific word, the electronic device 100 may determine whether or not the specific word is included in the user response, and in a case in which the question is the question demanding the selection of one of the plurality of objects displayed on the display, the electronic device 100 may determine whether or not the object demanded to be selected among the plurality of objects is selected.

When the user response corresponding to the question is input, the electronic device 100 may perform the task corresponding to the user speech, and provide a result for the performed task. As an example, the electronic device 100 may perform a text transmission task as the task corresponding to the user speech 10, and output a guide message 40 "sent a message to XX" indicating a result of performing the text transmission task.

According to the embodiment described above, the electronic device 100 may perform the task corresponding to the user speech through the user confirmation to protect the user privacy and enhance security.

A case in which the artificial intelligence agent system is stored in the electronic device 100 and the electronic device 100 directly determines whether or not the user speech is the user speech related to the task requiring the user confirmation and generates the question has been described in the embodiment described above, but this is only an example.

Some of the operations described above may be implemented by an external server or other device. As an example, the external server may obtain the text for the user speech, determine whether or not the user speech is the user speech related to the task requiring the user confirmation, or generate the question.

The electronic device 100 may use an artificial intelligence agent to provide the response to the user speech as described above. In this case, the artificial intelligence agent, which is a dedicated program for providing an artificial intelligence (AI) based service (for example, a speech recognition service, a secretary service, a translation service, a search service, or the like), may be executed by an existing general-purpose processor (for example, a central processing unit (CPU)) or a separate AI dedicated processor (for example, a graphics processing unit (GPU), or the like). Particularly, the artificial intelligence agent may control various modules (for example, a dialogue system) to be described below.

In detail, in a case in which a predetermined user speech (for example, "Bixby" or the like) is input or a button (for example, a button for executing the artificial intelligence agent) provided in the electronic device 100 is pressed, the artificial intelligence agent may be operated. In addition, the artificial intelligence agent may analyze the user speech to determine whether or not the user speech is the user speech related to the task requiring the user confirmation and generate and provide the question on the basis of a determination result.

In the case in which the predetermined user speech (for example, "Bixby" or the like) is input or the button (for example, the button for executing the artificial intelligence agent) provided in the electronic device 100 is pressed, the artificial intelligence agent may be operated. In addition, the artificial intelligence agent may be in a state in which it is executed before the user speech is input or the button (for example, the button for executing the artificial intelligence agent) provided in the electronic device 100 is pressed. In this case, after the predetermined user speech (for example, "Bixby" or the like) is input or the button (for example, the button for executing the artificial intelligence agent) provided in the electronic device 100 is pressed, the artificial intelligence agent of the electronic device 100 may perform the task for the user speech. For example, in a case in which the artificial intelligence is executed by an AI dedicated processor, a function of the electronic device 100 may be executed by a general-purpose processor before the predetermined user speech (for example, "Bixby" or the like) is input or the button (for example, the button for executing the artificial intelligence agent) provided in the electronic device 100 is pressed, and may be performed by the AI dedicated processor after the predetermined user speech (for example, "Bixby" or the like) is input or the button (for example, the button for executing the artificial intelligence agent) provided in the electronic device 100 is pressed.

In addition, the artificial intelligence agent may be in a standby state before the user speech is input or the button (for example, the button for executing the artificial intelligence agent) provided in the electronic device 100 is pressed. Here, the standby state is a state in which it is sensed that a predefined user input is received to control an operation start of the artificial intelligence agent. When the predetermined user speech (for example, "Bixby" or the like) is input or the button (for example, the button for executing the artificial intelligence agent) provided in the electronic device 100 is pressed while the artificial intelligence agent is in the standby state, the electronic device 100 may operate the artificial intelligence agent and perform the task for the user speech using the operated artificial intelligence agent.

In addition, the artificial intelligence agent may be in a state in which it ends before the user speech (for example, "Bixby" or the like) is input or the button (for example, the button for executing the artificial intelligence agent) provided in the electronic device 100 is pressed. When the predetermined user speech (for example, "Bixby" or the like) is input or the button (for example, the button for executing the artificial intelligence agent) provided in the electronic device 100 is pressed in the state in which the artificial intelligence agent ends, the electronic device 100 may execute the artificial intelligence agent and perform the task for the user speech using the executed artificial intelligence agent.

The artificial intelligence agent may control various devices or modules to be described below. This will be described in detail below. In addition, specific examples of analyzing the user speech using various learned models between the electronic device 100 and the server to determine whether or not the user speech is the user speech related to the task requiring the user confirmation and generating and providing the question on the basis of the determination result will hereinafter be described through diverse embodiments.

Figure 2:
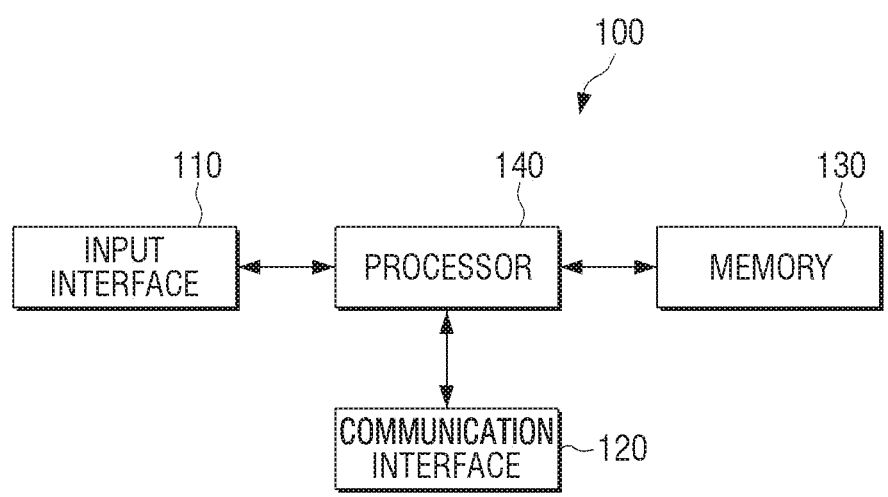
FIG. 2 is a block diagram illustrating components of an electronic device according to an embodiment of the disclosure.

FIG. 2 is a block diagram illustrating components of an electronic device according to an embodiment of the disclosure.

Referring to FIG. 2, the electronic device 100 may include an input interface 110, a communication interface 120, a memory 130, and at least one processor 140. However, the electronic device is not limited to including the components described above, and some components may be added, omitted, or combined depending on a type of desired electronic device.

The input interface 110 may receive a user input for controlling the electronic device 100. As an example, the input interface 110 may receive various user manipulations such as a user touch, a user speech, or the like, of the user for controlling the electronic device 100. Particularly, the input interface 110 may receive the user speech for performing the task.

The communication interface 120 is a component for performing communication with any number of external devices, and may perform various communications with an external electronic device when needed. A communication connection of the communication interface 120 with the external device may include communication through a third device (for example, a relay, a hub, an access point, a server, a gateway, or the like). Wireless communication may include cellular communication that uses at least one of, for example, long-term evolution (LTE), LTE Advance (LTE-A), code division multiple access (CDMA), wideband CDMA (WCDMA), universal mobile telecommunications system (UMTS), wireless broadband (WiBro), or global system for mobile communications (GSM). According to an embodiment, the wireless communication may include at least one of, for example, wireless fidelity (WiFi), Bluetooth, Bluetooth low power (BLE), Zigbee, near field communication (NFC), magnetic secure transmission, radio frequency (RF), or body area network (BAN). Wired communication may include at least one of, for example, universal serial bus (USB), high definition multimedia interface (HDMI), recommended standard 232 (RS-232), power line communication, or plain old telephone service (POTS). A network through which the wireless communication or the wired communication is performed may include at least one of a telecommunications network, for example, a computer network (for example, a local area network (LAN) or a wide area network (WAN)), the Internet, or a telephone network.

In addition, the communication interface 120 may perform communication with the external server to provide the artificial intelligence service. Particularly, the communication interface 120 may transmit the user speech to the external server, and receive the question for the user confirmation from the external server.

The memory 130 may store commands or data related to at least one other component of the electronic device 100. Particularly, the memory 130 may be implemented by a non-volatile memory, a volatile memory, a flash memory, a hard disk drive (HDD), a solid-state drive (SDD), or the like. The memory 130 may be accessed by the processor 140, and readout, recording, correction, deletion, update, and the like, of data in the memory 130 may be performed by the processor 140. In the disclosure, a term 'memory' may include the memory 130, a read only memory (ROM) (not illustrated) in the processor 140, a random access memory (RAM) (not illustrated), or a memory card (not illustrated) (for example, a micro secure digital (SD) card or a memory stick) mounted in the electronic device 100. In addition, programs, data and the like, for configuring various screens to be displayed on a display region of a display may be stored in the memory 130.

Further, the memory 130 may store the artificial intelligence agent for operating the dialogue system. In detail, the electronic device 100 may use the artificial intelligence agent to generate a natural language as a response to the user utterance. In this case, the artificial intelligence agent may be a dedicated program for providing an AI-based service (for example, a speech recognition server, a secretary service, a translation service, a search service, or the like). Particularly, the artificial intelligence agent may be executed by an existing general-purpose processor (for example, a CPU) or a separate AI dedicated processor (for example, a GPU or the like).

Figure 4:
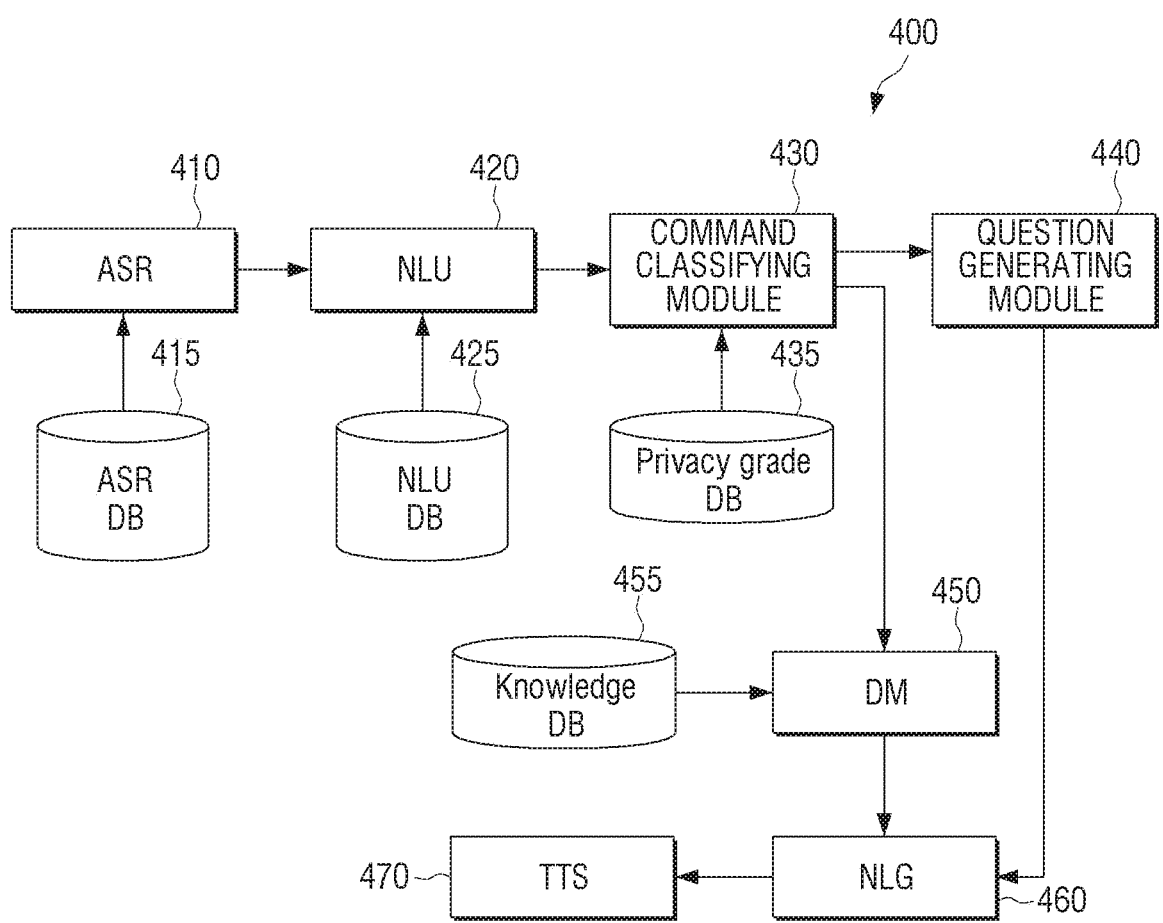
FIG. 4 is a block diagram illustrating a dialogue system of an artificial intelligence agent system according to an embodiment of the disclosure.

In addition, the memory 130 may include a plurality of components (or modules) configuring a dialogue system as illustrated in FIG. 4. Particularly, the memory 130 may include a command classifying module 430 and a question generating module 440. This will be described in detail with reference to FIG. 4.

The processor 140 may be electrically connected to the memory 130 to control a general operation and function of the electronic device 100. Particularly, the processor 140 may execute at least one command stored in the memory 130 to receive the user speech through the input interface 110 and analyze the user speech, thereby determining whether or not the user speech is the speech related to the task requiring the user confirmation. In addition, when it is determined that the user speech is the speech related to the task requiring the user confirmation, the processor 140 may generate and provide the question for the user confirmation. Further, when the user response corresponding to the question is input through the input interface 110, the processor 130 may perform the task corresponding to the user speech.

In detail, the processor 140 may determine whether or not the task related to the user speech is the task requiring the user confirmation, such as the task related to the user privacy or demanding the security. As an example, the processor 140 may determine whether or not the task related to the user speech is one of the remittance task, the product purchase task, the email transmission task, the message transmission task, or the telephone call task.

In addition, the processor 140 may analyze the user speech input through the input interface 110 to identify the task related to the user speech and the entity for performing the task, obtain the security score of the user speech on the basis of the identified task and entity, and determine whether or not the user speech is the speech related to the task requiring the user confirmation on the basis of the security score of the user speech.

Further, the processor 140 may generate the question on the basis of the security score when the user speech is the speech related to the task requiring the user confirmation on the basis of the security score of the user speech. As an example, the processor 140 may generate a question having a low relevance to the task corresponding to the user speech as the security score becomes high, and a question having a high relevance to the task corresponding to the user speech as the security score becomes low.

In addition, when the security score is a threshold value or more, the processor 140 may provide the authentication message for the user authentication.

Further, the processor 140 may extract at least one of the texts included in the user speech and generate the question for inducing the user utterance for the extracted at least one text.

Further, the processor 140 may analyze the speech of the user that uses the electronic device 100 to obtain the speech feature information on the text distinguished from that of another user and store the speech feature information in the memory 130. Further, when it is determined that the user speech is the speech related to the task requiring the user confirmation, the processor 140 may generate the question including the stored text. Further, when the speech feature information on the text is obtained in the user response, the electronic device 100 may perform the task corresponding to the user speech.

Figure 3:
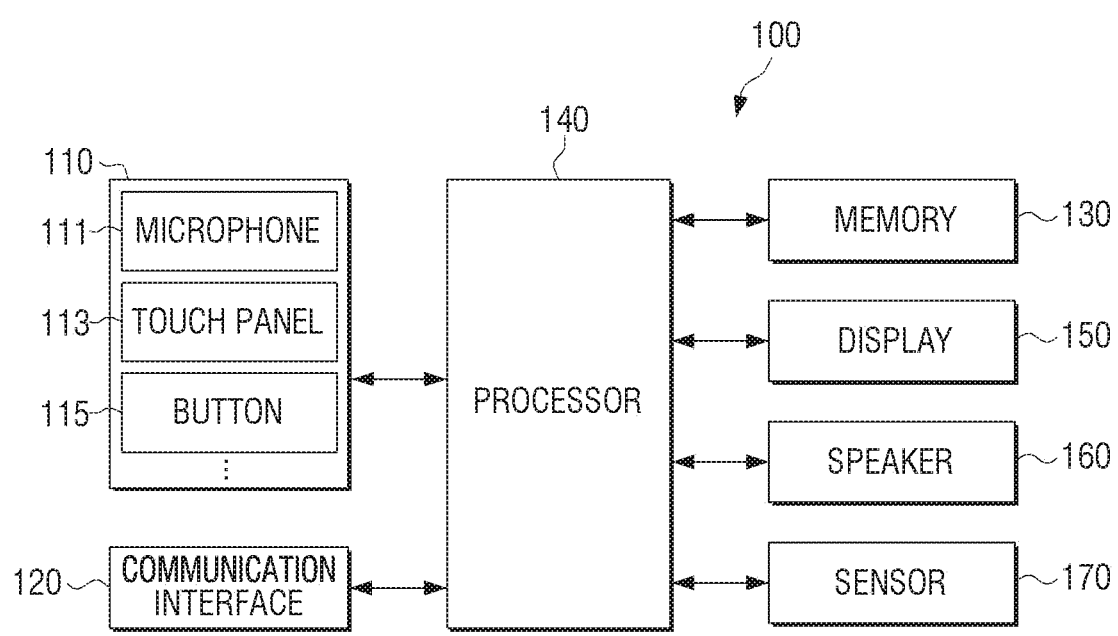
FIG. 3 is a block diagram illustrating detailed components of an electronic device according to an embodiment of the disclosure.

FIG. 3 is a block diagram illustrating detailed components of an electronic device according to an embodiment of the disclosure in detail.

Referring to FIG. 3, the electronic device 100 may include the input interface 110, the communication interface 120, the memory 130, a display 150, a speaker 160, a sensor 170, and the processor 140. The input interface 110, the communication interface 120, the memory 130, and the processor 140 illustrated in FIG. 3 have been described with reference to FIG. 2, and an overlapping description thereof is thus omitted.

The input interface 110 may receive a user input for controlling the electronic device 100. Particularly, the input interface 110 may receive a user speech for performing a specific task. The input interface 110 may include a microphone 111 for receiving the user speech, a touch panel 113 for receiving a user touch using a user's hand, a stylus pen or the like, a button 115 for receiving a user manipulation, and the like, as illustrated in FIG. 3. However, the input interface 110 illustrated in FIG. 3 is only an example, and may be implemented by other input devices (for example, a keyboard, a mouse, a motion input, or the like).

The display 150 may display various types of information according to control of the processor 140. Particularly, the display 150 may display a user interface (UI) including a plurality of objects for a question. In addition, the display 150 may display a message window including a dialogue between the user and the artificial intelligence agent. The display 150 may be implemented by a touch screen together with the touch panel 113.

The speaker 160 is a component outputting various alarms or speech messages as well as various audio data on which various processes such as decoding, amplification, noise filtering, and the like, are performed by an audio processor. Particularly, the speaker 160 may output a question or a guide message for the user speech as a speech message having a natural language form. A component for outputting an audio may be implemented by the speaker, but this is only an example, and the component for outputting an audio may be implemented by an output terminal that may output audio data.

The sensor 170 may sense various types of state information of the electronic device 100. As an example, the sensor 170 may include a motion sensor (for example, a gyro sensor, an acceleration sensor or the like) that may sense motion information of the electronic device 100, and may include a sensor (for example, a GPS sensor) that may sense position information, a sensor (for example, a temperature sensor, a humidity sensor, an atmospheric pressure sensor, or the like) that may sense environmental information around the electronic device 100, a sensor (for example, a blood pressure sensor, a blood sugar sensor, a pulse rate sensor, or the like) that may detect user information of the electronic device 100, and the like. The sensor 170 may further include an image sensor or the like for capturing an image of the outside of the electronic device 100.

FIG. 4 is a block diagram illustrating a dialogue system of an artificial intelligence agent system according to an embodiment of the disclosure.

Referring to FIG. 4, a dialogue system 400 is a component for performing a dialogue with a virtual artificial intelligence agent through a natural language. According to an embodiment of the disclosure, the dialogue system 400 may be stored in the memory 130 of the electronic device 100. However, this is only an example, and at least one component included in the dialogue system 400 may be included in at least one external server.

The dialogue system 400 may include an automatic speech recognition (ASR) module 410, a natural language understanding (NLU) module 420, the command classifying module 430, the question generating module 440, a dialogue manager (DM) module 450, a natural language generator (NLG) module 460, and a text to speech (TTS) module 470. The dialogue system 400 may further include a path planner module, an action planner module, or the like.

The automatic speech recognition (ASR) module 410 may convert the user speech received from the electronic device 100 into text data. For example, the automatic speech recognition module 410 may include an utterance recognition module. The utterance recognition module may include an acoustic model and a language model. For example, the acoustic model may include information related to vocalization, and the language model may include information on a combination of unit phoneme information and unit phoneme information. The utterance recognition module may convert the user utterance into the text data using the information related to the vocalization and the information on the unit phoneme information. The information on the acoustic model and the language model may be stored in, for example, an automatic speech recognition database (ASR DB) 415.

The natural language understanding module 420 may perform a syntactic analysis or a semantic analysis to grasp a user's intent. The syntactic analysis may divide the user input into syntactic units (for example, words, phrases, morphemes, or the like) and grasp which grammatical elements the divided units have. The semantic analysis may be performed using semantic matching, rule matching, formula matching, or the like. Therefore, the natural language understanding module 420 may obtain a domain, an intent, or an entity (or a parameter, a slot or the like) required for expressing the intent from the user input.

The natural language understanding module 420 may determine a task that the user intends to perform and an entity using a matching rule divided into the domain, the intent, and the entity required for grasping the intent. For example, one domain (for example, a message) may include a plurality of intents (for example, message transmission, message deletion and the like) for determining the task and one intent may include a plurality of entities (for example, a transmission target, a transmission time, a transmission content, and the like). A plurality of rules may include, for example, one or more essential element parameters. The matching rule may be stored in a natural language understanding database (NLU DB) 425.

The natural language understanding module 420 may grasp the meaning of words extracted from the user input using a linguistic feature (for example, a grammatical element) such as morphemes, phrases or the like, and match the grasped meaning of the words with the domain and the intent to determine the task that the user intends to perform. For example, the natural language understanding module 420 may calculate how many words extracted from the user input are included in each domain and intent to determine the task that the user intends to perform. According to an embodiment, the natural language understanding module 420 may determine an entity of the user speech using a word that is a basis for grasping the task that the user intends to perform. According to an embodiment, the natural language understanding module 420 may determine the task related to the user speech using the natural language recognition database 425 in which a language feature for grasping the task related to the user speech is stored. In this case, personal information or the like may be included in the natural language recognition database 425.

The natural language understanding module 420 may generate a path rule on the basis of the task related to the user speech and the entity. For example, the natural language understanding module 420 may select an application to be executed on the basis of the intent of the user input and determine a task to be performed in the selected application. The natural language understanding module 420 may generate the path rule by determining an entity corresponding to the determined task. According to an embodiment, the path rule generated by the natural language understanding module 420 may include information on the application to be executed, the task to be executed in the application, and the entity required to execute the task.

The natural language understanding module 420 may generate one path rule or a plurality of path rules on the basis of the task related to the user speech and the entity. For example, the natural language understanding module 420 may receive a path rule set corresponding to the electronic device 100 from the path planner module, and map the task related to the user speech and the entity to the received path rule set to determine a path rule. In this case, the path rule may include information on a task (or an operation) for performing a function of an application or information on an entity required to execute the task. In addition, the path rule may include an operation order of the application. The electronic device 100 may receive the path rule, select the application according to the path rule, and execute the task included in the path rule in the selected application.

The natural language understanding module 420 may generate one path rule or the plurality of path rules by determining an application to be executed, a task to be executed in the application, and an entity required to execute the task on the basis of the task related to the user speech and the entity. For example, the natural language understanding module 420 may generate the path rule by arranging applications to be executed and tasks to be executed in the applications in an ontology or graph model form according to the intent of the user speech using information of the electronic device 100. The generated path rule may be stored in a path rule database through, for example, the path planner module. The generated path rule may be added to a path rule set of the database 425.

The natural language understanding module 420 may select at least one of the plurality of path rules that are generated. As an example, the natural language understanding module 420 may select an optimal path rule of the plurality of path rules. As another example, the natural language understanding module 420 may select the plurality of path rules in a case in which only some tasks are specified on the basis of the user speech. The natural language understanding module 420 may determine one of the plurality of path rules by an additional input of the user.

The command classifying module 430 may determine whether or not the user speech is the speech related to the task requiring the user confirmation on the basis of the task related to the user speech and the entity acquired through the natural language understanding module 420. In detail, the command classifying module 430 may obtain a security score of the task related to the user speech and a security score of the entity obtained through the natural language understanding module 420. In this case, the security score of the task and the security score of the entity may be pre-stored in a security score DB 435. In addition, the security score of the task may be predetermined on the basis of whether or not the security score is required for the task, a frequency of use of the task, and the like. As an example, as illustrated in Table 1, the security score of the task may be stored in a security score or privacy grade DB 435.

TABLE 1

| Kind of Task | Security Score |
| --- | --- |
| Remittance Task | 5 |
| Product Purchase Task | |
| Message Transmission Task and Email Transmission Task | 3 |
| Telephone Call Task | 2 |
| Content Reproduction Task, Email Reading Task, or the like | 0 |

In addition, the security score of the entity may be determined on the basis of an importance, an amount, and a frequency of use of the entity for each task. As an example, in a case of the remittance task, the electronic device 100 may determine the security score using a log for an amount of money used at the time of remittance. As an example, an entity in which information on an amount of money mainly used by the user is included may have a low security score, and an entity in which information on an amount of money that is not mainly used by the user is included may have a high security score. That is, because log information of the user is used, different security scores may be generated for the same amount of money depending on user information of the user using the electronic device 100. As another example, in a case of the message transmission task, the email transmission task, and a telephone task, different security scores may be generated depending on contact frequencies for other users obtained from contact information application of the user and information of the other users (for example, a VIP and a friend). In addition, even when the task is performed by the same user, different security scores may be generated and stored depending on a type or a size of an attached item (a photograph file, a video file, an audio file, or a document). As an example, as illustrated in Table 2, the security score of the entity may be stored in the DB 435.

TABLE 2

| Kind of Task | Entity | Security Score |
| --- | --- | --- |
| Remittance Task | 0~100$ | 1 |
| | 100~1000$ | 2 |
| | 1000$ | 3 |
| Message Transmission Task, Email Transmission Task, and Telephone Call Task | Sending Target is Family Group | 1 |
| | Sending Target is Company Group | 3 |
| | Sending Target is Friend Group | 2 |
| | Attached File is Landscape Photograph | 2 |
| | Attached File is Portrait Photograph | 3 |

The security score of the task and the security score of the entity may be stored in the DB 425, but this is only an example and the security score of the task and the security score of the entity may be calculated by the command classifying module 430. For example, information on the task and the entity may be input to a pre-learned artificial intelligence model, such that the security score of the task and the security score of the entity may be obtained. The command classifying module 430 may obtain a security score of the user speech on the basis of the obtained security score of the task and the obtained security score of the entity. In this case, the command classifying module 430 may obtain the security score of the user speech through Equation 1.

$$\text{Security Score of User Speech} = (\text{Security Score of Task}) * w_1 + (\text{Security Score of Entity}) * w_2 \quad \text{Equation (1)}$$

As an example, $w_1$ and $w_2$ may be implemented by coefficients such as 0.8 and 0.2, respectively, but this is only an example, and the security score of the user speech may be calculated using different coefficients depending on user information or the like. In addition, Equation 1 is only an example, and the security score of the user speech may be calculated by different Equations depending on a kind of the entity, a type of the task, the user information, and the like.

In addition, the command classifying module 430 may request the external server to calculate the security score, to calculate a more accurate security score in a case in which the task or the entity corresponding to the user speech cannot be determined, such that the security score cannot be calculated or when it is determined that the security score calculated by a linear equation such as Equation 1 is within a threshold range. In this case, the external server may calculate the security score using a learned artificial intelligence model having an accuracy higher than that of the linear equation.

In addition, the command classifying module 430 may determine whether or not the task related to the user speech is the task requiring the user confirmation on the basis of the obtained security score of the user speech. In detail, the command classifying module 430 may determine whether or not the task related to the user speech is the task requiring the user confirmation on the basis of whether or not the security score of the user speech is a predetermined value (for example, 2) or more. As an example, in a case in which a task related to a first user speech is a remittance task and a remittance amount is $200, the command classifying module 430 may determine that a security score of the first user speech is 5*0.8+2*0.2=4.4, and may determine that the task related to the first user speech is the task requiring the user confirmation because the security score of the first user speech is a predetermined value or more. As an example, in a case in which a task related to a second user speech is a telephone call task and a telephone call target is a family, the command classifying module 430 may determine that a security score of the second user speech is 2*0.8+1*0.2=1.8, and may determine that the task related to the second user speech is not the task requiring the user confirmation because the security score of the second user speech is less than a predetermined value.

The command classifying module 430 determines whether or not the task related to the user speech is the task requiring the user confirmation on the basis of the security score in the embodiment described above, but this is only an example, and the command classifying module 430 may determine whether or not the task related to the user speech is a predefined task to determine whether or not the task related to the user speech is the task requiring the user confirmation. As an example, in a case in which the task related to the user speech is one of a pre-stored remittance task, product purchase task, email transmission task, message transmission task, or telephone call task, the command classifying module 430 may determine that the task related to the user speech is the task requiring the user confirmation.

When it is determined that the task related to the user speech is the task requiring the user confirmation, the command classifying module 430 may output information (for example, text information, security score information and the like) related to the user speech to the question generating module 440, and it is determined that the task related to the user speech is not the task requiring the user confirmation, the command classifying module 430 may output information (for example, text information and the like) related to the user speech to the dialogue manager module 450.

The question generating module 440 may generate a question for the user confirmation for performing the task related to the user speech. In this case, the question generating module 440 may generate a question that is not related to the task related to the user speech. For example, in a case in which the task related to the user speech is the remittance task, the question generating module 440 may ask a question such as a weather question, a text utterance induction question, or the like, that is not related to the remittance task.

In addition, the question generating module 440 may generate a question for inducing an answer having a low utterance frequency to the user. As an example, the question generating module 440 generates a question (for example, "please tell me a name of the highest mountain in Jeju Island if you want to send an email now") for inducing a response including a text that is not frequently used currently by the user. As another example, the question generating module 440 may generate a question (for example, "please read xxxx (random number) if you want to send an email now") demanding arbitrary number or text utterance. As still another example, the question generating module 440 may generate a question (for example, "please tell me the date of your birth if you want to send an email now") demanding personal information of the user. In this case, an utterance frequency may be calculated through user log information or a text corpus.

In addition, the question generating module 440 may generate a question on the basis of the security score of the user speech. In detail, the question generating module 440 may determine the complexity of the question on the basis of the security score of the user speech. As an example, the question generating module 440 may generate a question demanding a complex response as the security score becomes high, and may generate a question requiring a simple response (for example, yes/no) as the security score becomes low.

In detail, the question generating module 440 may determine a relevance between the task of the user speech and the question on the basis of the security score of the user speech. As an example, the question generating module 440 may generate a question that is not related to the task of the user speech as the security score becomes high. That is, the question generating module 440 may generate a question inducing utterance semantically distant from the task of the user speech (distant from a command domain tree or a command vector in a continuous space). As an example, the question generating module 440 may express the text in a vector space using an artificial intelligence model such as a skip-gram model that may map the text in the vector space. In addition, the question generating module 440 may generate a question inducing utterance semantically distant from the task of the user speech using a similarity between vector angles (that is, a cosine similarity) corresponding to texts expressed on the vector space or a distance between two vectors. As an example, when the distance between the two vectors is 90 degrees or the distance between the two vectors is large, the electronic device 100 may determine that the texts corresponding to the two vectors are unrelated to each other.

The question generating module 440 may generate a question that is related to the task of the user speech as the security score becomes low. In addition, the question generating module 440 may generate a question requiring user authentication on the basis of the security score of the user speech. As an example, in a case where the security score of the user speech is a predetermined value or more, the question generating module 440 may generate a question demanding the personal information of the user for the user authentication.

In addition, because the question generating module 440 needs to compare the user response to the question with a correct answer to the question, the question generating module 440 may generate a question inducing utterance expected to have a high accuracy using log information such as an existing response of the user, or the like.

In addition, the question generating module 440 may generate a question on the basis of a situation around the electronic device 100. In detail, the question generating module 440 may determine a place (for example, a home, a vehicle, a public place, or the like) where the electronic device 100 is positioned by various methods. As an example, the question generating module 440 may determine a place where the electronic device 100 is positioned on the basis of network information connected to the electronic device 100, GPS information, information on an external device connected to the electronic device 100, and the like. In detail, the question generating module 440 may determine whether or not the position of the electronic device 100 is a home or a public place on the basis of the network information (for example, an Internet protocol (IP) address) connected to the electronic device 100, position information detected through a GPS, and the like. In addition, in a case in which the number of external devices searched on the basis of information (for example, a type of device, a name of the device, and the like) on the external device searched through a communication module such as Bluetooth is one, the question generating module 440 may determine that the position of the electronic device 100 is the home, and in a case in which the number of anonymous external devices searched on the basis of the information on the external device is plural, the question generating module 440 may determine that the position of the electronic device 100 is the public place.

Alternatively, the question generating module 440 may determine a place where the electronic device 100 is positioned or whether or not a person is present around the electronic device 100 on the basis of external noise acquired through a microphone, an environmental noise vector, whether or not there is a dialogue with the surrounding person, and the like. In detail, the question generating module 440 may determine whether a place of a current noise is a vehicle, a library, a toilet, or a subway by inputting an audio obtained through the microphone to a learned artificial intelligence model or a hidden Markov model (HMM) based acoustic model. Alternatively, the question generating module 440 may determine a place where the electronic device 100 is positioned by measuring a size Db of the audio obtained through the microphone. In addition, the electronic device 100 may determine a place where the electronic device 100 is positioned using the environmental noise vector. In detail, the electronic device 100 may generate and store a vector transformation model depending on a kind of noise, such as speaker recognition vector transformation. The question generating module 440 may sense a noise portion except for an utterance portion using a speech recognition acoustic model, convert a sound source segment of the noise portion into an environmental vector using a pre-stored vector conversion model, compare the previously generated vectors for each noise with environmental vectors to obtain a score (for example, a cosine distance), and then determine a place or an environment where the electronic device 100 is currently positioned on the basis of the obtained score. In addition, the question generating module 440 may determine whether or not there is a dialogue with the surrounding person or information on a person having a dialogue on the basis of pre-registered speaker information to determine a place or an environment where the electronic device 100 is currently positioned or whether or not persons are present around the electronic device 100.

The question generating module 440 may generate a question on the basis of the determined position of the electronic device 100 or whether or not there is another person. In detail, when it is determined that the electronic device 100 is positioned at a home or that a person is not present around the electronic device 100, the question generating module 440 may generate a question including personal information. However, when it is determined that the electronic device 100 is positioned at the outside or that a person is present around the electronic device 100, the question generating module 440 may generate a question that does not include personal information.

In addition, the question generation module 440 may generate a question by various methods. This will be described in detail with reference to FIGS. 6A to 9B.

The dialogue manager module 450 may perform the task determined by the natural language understanding module 420. That is, the dialogue manager module 450 may perform the task on the basis of the task and the entity obtained on the basis of the natural language understanding module 420, and generate a response to the user speech.

In addition, the dialogue manager module 450 may determine whether or not the intent of the user grasped by the natural language understanding module 420 is clear. For example, the dialogue manager module 450 may determine whether or not the intent of the user is clear on the basis of whether or not information of the entity is sufficient. The dialogue manager module 450 may determine whether or not the entity grasped in the natural language understanding module 420 is sufficient to perform the task. According to an embodiment, in a case in which the intent of the user is not clear, the dialogue manager module 450 may perform feedback for requesting the user to input required information. For example, the dialogue manager module 450 may perform feedback for requesting the user to input information on an entity for grasping the intent of the user. In addition, the dialogue manager module 450 may generate and output a message for confirming a user query including the text changed by the natural language understanding module 420.

According to an embodiment, the dialog manager module 450 may include a content provider module. In a case in which the content provider module can perform an operation on the basis of the task and the entity grasped by the natural language understanding module 420, the content provider module may generate a result of performing a task corresponding to a user input.

According to another embodiment, the dialogue manager module 450 may provide a response to the user speech using a knowledge base stored in a knowledge DB 455. In this case, the knowledge base may be included in the electronic device 100, but this is only an example and the knowledge base may be included in the external server.

The natural language generator module (NLG module) 460 may change the information output through the question generating module 430 or the dialogue manager module 450 into a text form. The information changed into the text form may have a form of natural language utterance. The information changed into the text form may be, for example, information on an additional input, information for guiding completion of an operation corresponding to the user input, or information (for example, feedback information for the user input) for guiding an additional input of the user. The information changed into the text form may be displayed on the display 150 of the electronic device 100 or may be changed into a speech form by the text to speech module (TTS module) 470.

The text to speech module (TTS module) 470 may change the information having text form into information having speech form. The text to speech module 470 may receive the information having the text form from the natural language generating module 440, change the information having the text form into the information having the speech form, and output the information having the speech form to the speaker.

The natural language understanding module 420, the command classifying module 430, the question generating module 440, and the dialogue manager module 450 may be implemented as at least one module. As an example, the natural language understanding module 420, the command classifying module 430, the question generating module 440, and the dialogue manager module 450 may be implemented as one module to determine the task and the entity of the user, determine whether or not the task related to the user speech is the task requiring the user confirmation on the basis of the determined task and entity of the user, and generate the question or obtain the response (for example, the path rule) corresponding to the user speech on the basis of a determination result. As another example, the command classifying module 430 and the question generating module 440 may be included in the dialogue manager module 450.

Figure 5:
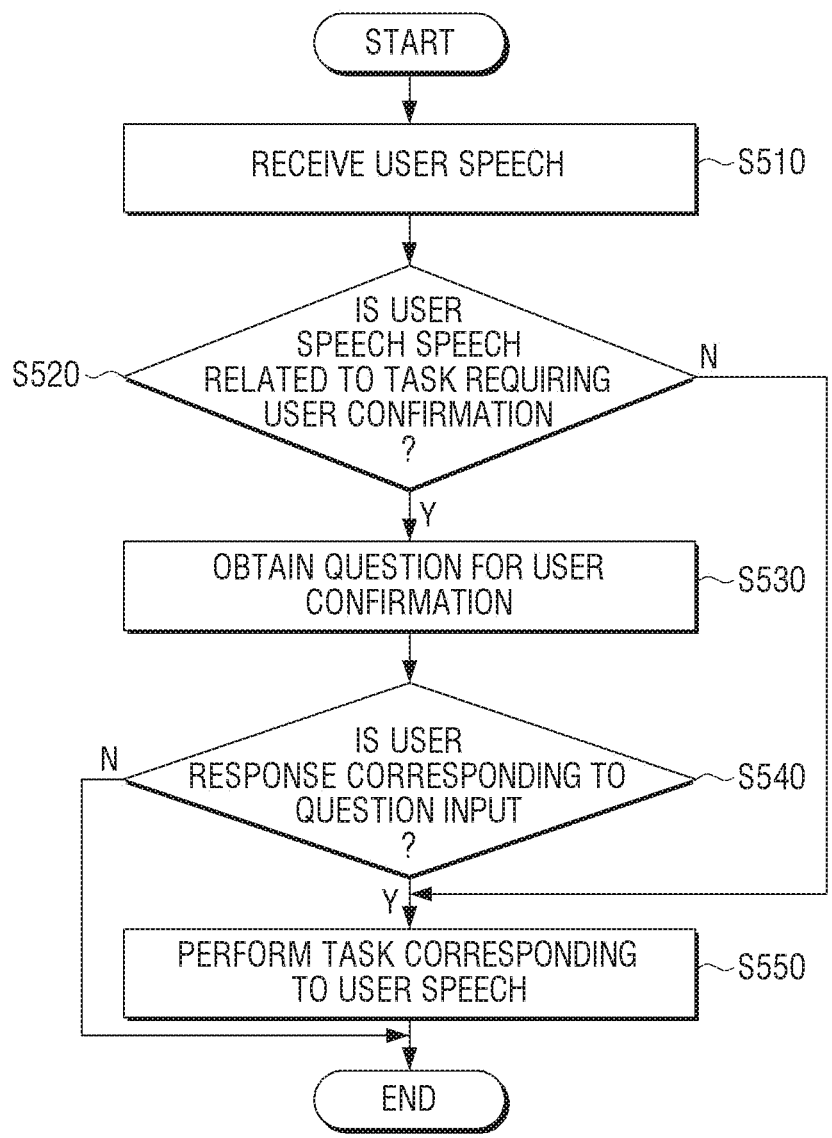
FIG. 5 is a flowchart for describing a control method of an electronic device providing a question for user confirmation in a case in which a user speech is a speech related to a task requiring the user confirmation, according to an embodiment of the disclosure.

FIG. 5 is a flowchart for describing a control method of an electronic device providing a question for user confirmation in a case in which a user speech is a speech related to a task requiring the user confirmation, according to an embodiment of the disclosure.

Referring to FIG. 5, the electronic device 100 may receive the user speech at operation S510. In this case, the electronic device 100 may receive the user speech through the microphone 111, but this is only an example, and the electronic device 100 may receive the user speech from the external device.

The electronic device 100 may determine whether or not the user speech is the speech related to the task requiring the user confirmation at operation S520. In detail, the electronic device 100 may determine whether or not the user speech is the speech related to the task requiring the user confirmation on the basis of whether or not the user speech is the speech related to the task related to the user privacy or requiring the security.

When it is determined that the user speech is the speech related to the task requiring the user confirmation at operation S520, the electronic device 100 may obtain (generate) the question for the user confirmation at operation S530. In this case, the question for the user confirmation may be a question that is not related to the task related to the user speech. The electronic device 100 may generate the question for the user confirmation by various methods, which will be described below with reference to FIGS. 6A to 9B. The electronic device 100 may output the question for the user confirmation. In this case, the electronic device 100 may output the question through the speaker 160, but this is only an example, and the electronic device 100 may output the question through the display 150.

The electronic device 100 may determine whether or not the user response corresponding to the question is input at operation S540.

When the user response corresponding to the question is input at operation S540-Y, the electronic device 100 may perform the task corresponding to the user speech at operation S550. However, when the user response corresponding to the question is not input at operation S540, the electronic device 100 may not perform the task corresponding to the user speech or output a question for additional confirmation or feedback.

When it is determined that the user speech is not the speech related to the task requiring the user confirmation at operation S520, the electronic device 100 may immediately perform the task corresponding to the user speech at operation S550.

Hereinafter, various examples of generating a question for user confirmation will be described with reference to FIGS. 6A to 9B.

Figure 6A:
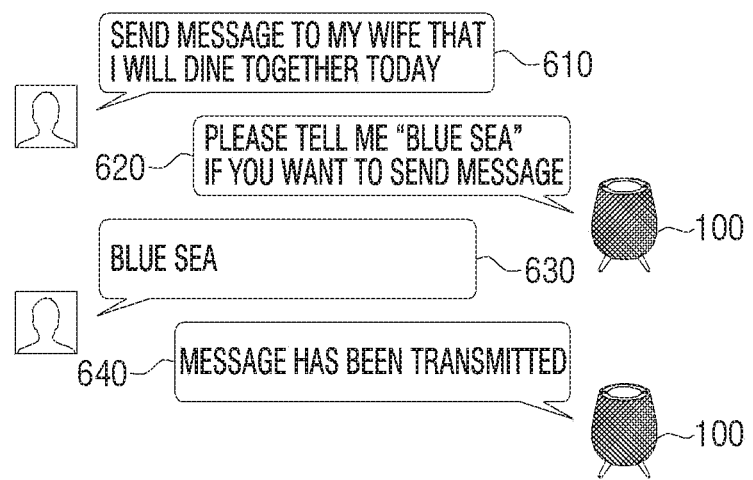
FIGS. 6A and 6B are views for describing examples of generating a question for user confirmation according to various embodiments of the disclosure.
Figure 6B:
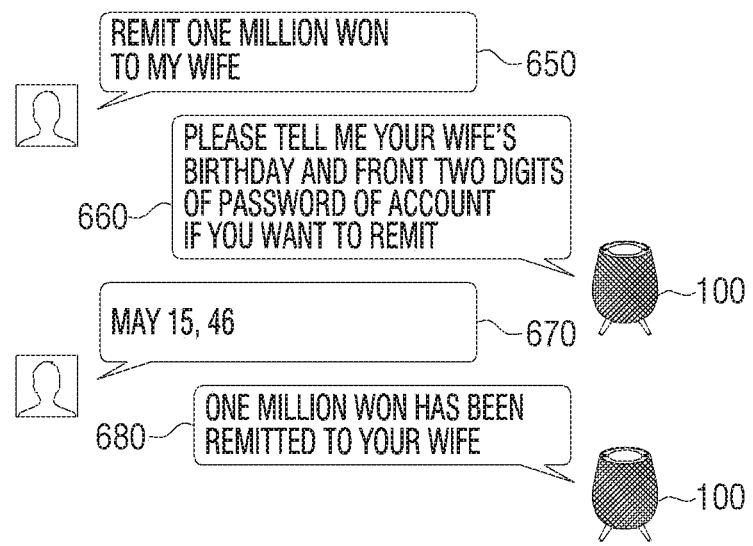

FIGS. 6A and 6B are views for describing examples of generating a question on the basis of a security score according to various embodiments of the disclosure.

Referring to FIG. 6A, the electronic device 100 may receive a user speech 610 "send a message to my wife that I will dine together today".

The electronic device 100 may calculate a security score of the received user speech 610. Referring to Table 1, Table, 2 and Equation 1, the electronic device 100 may determine that the security score of the user speech 610 is 2.8. Therefore, the electronic device 100 may determine that the security score of the user speech is a first threshold value (for example, 3) or less to generate a question having a low complexity.

As an example, the electronic device 100 may generate a question 620 "please tell me "blue sea" if you want to send a message".

In addition, when a user response 630 "blue sea" is received, the electronic device 100 may perform a message transmission task, which is a task related to the user speech, and output a guide message 640 "message has been transmitted", which is a result of performing the task.

Referring to FIG. 6B, the electronic device 100 may receive a user speech 650 "remit one million won to my wife".

The electronic device 100 may calculate a security score of the received user speech 650. Referring to Table 1, Table, 2 and Equation 1, the electronic device 100 may determine that the security score of the user speech 650 is 4.4. Therefore, the electronic device 100 may determine that the security score of the user speech is a second threshold value (for example, 4) or more to generate a question for user authentication. As an example, the electronic device 100 may generate a question 660 "please tell me your wife's birthday and front two digits of a password of an account if you want to remit" to demand personal information of the user. In this case, to prevent leakage of the personal information, the electronic device 100 may generate a question demanding only some of the personal information rather than all of the personal information.

In addition, when a user response 670 "May 15, 46" is received, the electronic device 100 may determine whether or not the user response 670 is a correct answer of the question 660, perform a remittance task, which is a task related to the user speech, when the user response 670 is the correct answer of the question 660, and output a guide message 680 "one million won has been remitted to your wife", which is a result of performing the task.

Figure 7A:
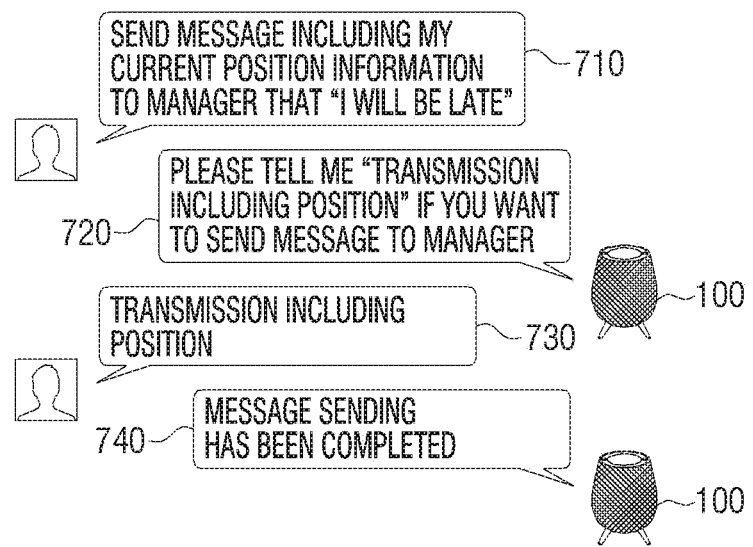
FIGS. 7A and 7B are views for describing examples of generating a question for user confirmation according to various embodiments of the disclosure.
Figure 7B:
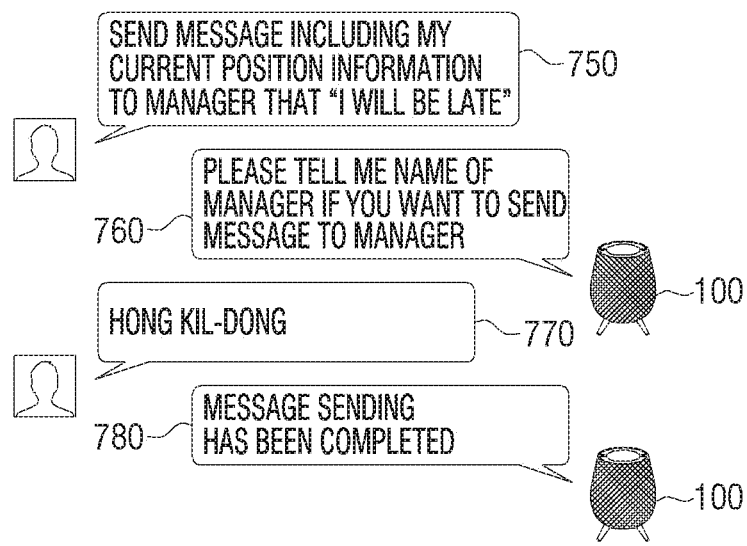

FIGS. 7A and 7B are views for describing examples of generating a question using some text included in a user speech according to various embodiments of the disclosure.

Referring to FIG. 7A, the electronic device 100 may receive a user speech 710 "send a message including my current position information to a manager that "I will be late"".

The electronic device 100 may calculate a security score of the received user speech 710. Referring to Table 1, Table, 2 and Equation 1, the electronic device 100 may determine that the security score of the user speech 710 is 3. Therefore, the electronic device 100 may determine that the security score of the user speech is a third threshold value (for example, 2) or more to ask a question for user confirmation.

In this case, the electronic device 100 may generate a question demanding utterance of at least one of a plurality of texts obtained through the automatic speech recognition module 410. In this case, the electronic device 100 may generate a question demanding utterance of at least one text determined to be a keyword among the plurality of texts. As an example, the electronic device 100 may generate a question 720 "please tell me "transmission including position" if you want to send a message to the manager". In this case, the electronic device 100 may generate a question demanding utterance of at least one text determined to be a keyword among the plurality of texts using a result value obtained through the natural language understanding (NLU) module. In detail, in a case in which named entity recognition (NER) is performed in a natural understanding process, the electronic device 100 may generate a question demanding utterance of a combined text by combining results of performing the NER with each other. As an example, in a case in which results of performing the NER {receiver: "manager", command: "send text", message: "late", additional_content: "position information"} are obtained, the electronic device 100 may generate a question demanding utterance of a combination of texts such as receiver and additional_content except for message. As another example, in a case in which an NLU result is not used, the electronic device 100 may generate a question by combining at least one text obtained through a result of automatic speech recognition (ASR) using a predetermined rule. As an example, the electronic device 100 may generate a question demanding utterance of "manager, current position information, message", which are nouns in texts obtained on the basis of an ASR result, by analyzing morphemes of the texts or tagging parts of speech of the texts. In addition, the electronic device 100 may generate a question demanding utterance of "position information", which is a text that is not uttered previously by the user among the texts obtained on the basis of the ASR result.

In addition, when a user response 730 "transmission including position" is received, the electronic device 100 may obtain current position information through the sensor 170 in response to the user response 730, perform a message transmission task for transmitting a message to the manager together with the obtained position information, and output a guide message 740 "message sending has been completed", which is a result of performing the task.

The electronic device 100 may also determine the complexity of the question on the basis of the security score of the user speech. For example the electronic device may generate a question demanding of utterance of more words (for example, "manager, late, position, including, transmission") as the security score becomes high, and generate a question demanding of utterance of less words (for example, "manager, transmission") as the security score becomes low.

Referring to FIG. 7B, the electronic device 100 may receive a user speech 750 "send a message including my current position information to a manager that "I will be late"".

The electronic device 100 may calculate a security score of the received user speech 750. Referring to Table 1, Table 2 and Equation 1, the electronic device 100 may determine that the security score of the user speech 750 is 3. Therefore, the electronic device 100 may determine that the security score of the user speech is a third threshold value (for example, 2) or more to ask a question for user confirmation.

In this case, the electronic device 100 may generate a question demanding information on the entity obtained through the natural language understanding module 420. In this case, the electronic device 100 may generate a question demanding information on a "sending target", which is the entity obtained through the natural language understanding module 420. As an example, the electronic device 100 may generate a question 760 "please tell me a name of the manager if you want to send a message to the manager".

In addition, when a user response 770 "Hong Kil-dong" is received, the electronic device 100 may obtain current position information through the sensor 170 in response to the user response 770, perform a message transmission task for transmitting a message to the manager together with the obtained position information, and output a guide message 780 "message sending has been completed", which is a result of performing the task.

Figure 8:
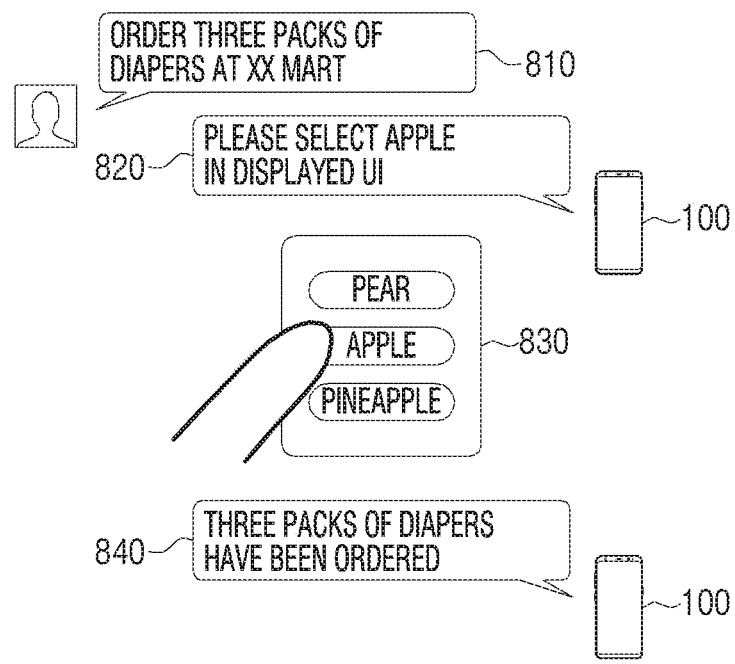
FIG. 8 is a view for describing an example of generating a question for user confirmation according to an embodiment of the disclosure.

FIG. 8 is a view for describing a method of generating a question depending on performance of an electronic device according to an embodiment of the disclosure.

In a case in which the electronic device 100 does not include the display 150, the electronic device 100 may generate a question demanding a user response having a speech form, as described above. However, in a case in which the electronic device 100 includes the display 150, the electronic device 100 may display a plurality of objects on the display 150 and generate a question inducing selection of one of the plurality of objects.

Referring to FIG. 8, the electronic device 100 may obtain a user speech 810 "order three packs of diapers at xx mart".

The electronic device 100 may calculate a security score of the received user speech 810. The electronic device 100 may determine that the security score of the user speech 810 is a third threshold value (for example, 2) or more to ask a question for user confirmation.

In this case, the electronic device 100 may display a UI 830 including a plurality of objects. In this case, the objects included in the UI 830 may include texts or images that are not related to the user speech. As an example, the electronic device 100 may display the UI 830 including fruit objects such as a "pear", an "apple", and a "pineapple", as illustrated in FIG. 8.

In addition, the electronic device 100 may generate a question demanding selection of at least one of the plurality of objects. As an example, the electronic device 100 may generate a question 820 "please select an apple in displayed UI".

In addition, when a user touch selecting the apple is input, the electronic device 100 may perform a product purchase task in response to the user touch, and output a guide message 840 "three packs of diapers have been ordered", which is a result of performing the task.

Even though the electronic device 100 includes the display 150, the electronic device 100 may display the UI on the display only in a specific situation (for example, a situation in which the user is presently close to the electronic device 100). As an example, when it is determined that the user is positioned close the electronic device or the user is in a state in which he/she wears the electronic device 100 or in a state in which he/she uses the electronic device 100 by analyzing an image captured through a camera or the speech received through the microphone, the electronic device 100 may display the UI on the display.

The question is the question demanding the selection of at least one of the plurality of objects displayed on the display in the embodiment described above, but this is only an example, and the electronic device 100 may generate a question demanding utterance of a text corresponding to at least one object displayed on the display 150. As an example, the electronic device 100 may display an object "apple" on the display 150 and generate a question "please tell me a name of a fruit displayed on a screen". The question is output in an audio form in the embodiment described above, but this is only an example, and the question may be output on the display 150.

When it is determined that another electronic device that the user is using is present, the electronic device 100 may generate a question for user confirmation using another electronic device. The electronic device 100 may generate the question for the user confirmation on the basis of sensor information that may be obtained by another electronic device, and receive the sensor information obtained by another electronic device to determine whether or not the user responds to the question.

As a method of determining whether or not another electronic device that the user is using is present, the electronic device 100 may sense that another electronic device determined to be possessed by the user is connected to the electronic device 100, and determine that the user is using another electronic device when the electronic device 100 receives device use information of the user from another electronic device.

The electronic device 100 may determine whether or not another electronic device is possessed by the user using user profile information of another electronic device, account information, authentication information, and biological information obtained from a biological sensor. The device use information may include information indicating whether or not another electronic device is worn by the user and information indicating whether or not another electronic device is being used by the user.

As an example, the information indicating whether or not another electronic device is worn by the user may be a case in which an attachable/detachable structure of a wearable device is in a fastened state and a time is within a reference time after motion of the wearable device and/or the electronic device 100 is detected, a case in which a time is within a reference time after a biological signal is detected in the wearable device and/or the electronic device 100, or a case in which an attachable/detachable structure of a wearable device is in a fastened state and a biological signal is detected in the wearable device. Whether or not the attachable/detachable structure of the wearable device is in the fastened state may be recognized using a sensed value of a sensor provided in the attachable/detachable structure of the wearable device. The sensor provided in attachable/detachable structure may include, for example, a conductive sensor, a hall sensor, a magnetic sensor, and the like. The motion of the wearable device and/or the electronic device 100 may be recognized using a motion sensor or an acceleration sensor provided in these devices. The wearable device and/or the electronic device 100 may include a bio-sensor detecting a biological signal to detect the biological signal. The bio-sensor may include, for example, a heart rate sensor, a pulse sensor, a blood pressure sensor, a sweat sensor, a body temperature sensor, an iris sensor, a fingerprint sensor, and the like.

As an example, the electronic device 100 may determine that the corresponding device is being used in a case in which a time is within a reference time after a user input is detected, in a case in which a user command is received to update a screen, or in a case in which a screen is in a turn-on state. As an example, the electronic device 100 may generate a question (or a request) "please shake your smartwatch worn by you". In addition, the electronic device 100 may receive motion information on motion of the smartwatch using a motion sensor or the like in the smartwatch to determine whether or not the user responds. As an example, the electronic device 100 may generate a question (or a request) "please ask you to perform fingerprint authentication on a device that you are currently using". Then, in a case in which a fingerprint is recognized and authenticated from a fingerprint sensor of another electronic device that the user is using, the electronic device 100 may receive corresponding authenticated information to determine whether or not the user responds.

Figure 9A:
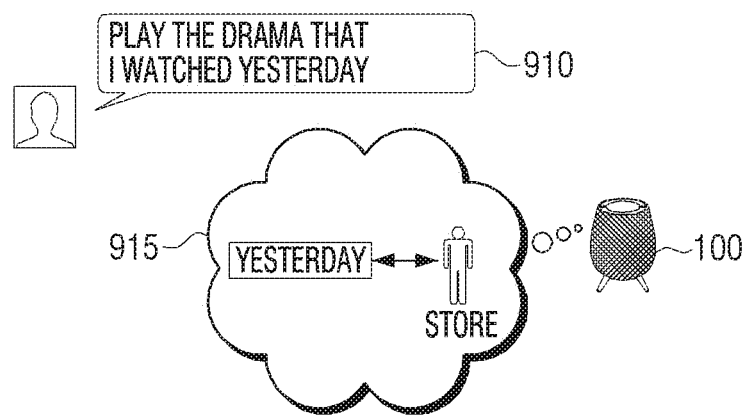
FIGS. 9A and 9B are views for describing examples of generating a question for user confirmation according to various embodiments of the disclosure.
Figure 9B:
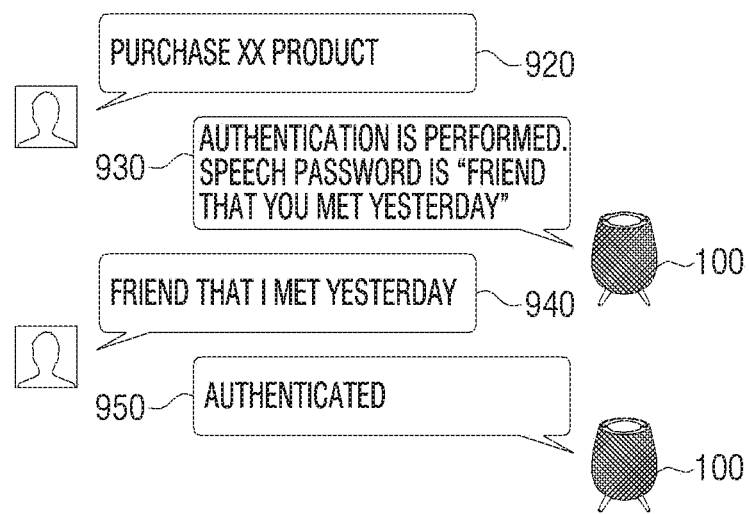

FIGS. 9A and 9B are views for describing examples of learning speech feature information of some texts included in a user speech and generating a question using the texts having the learned sound feature information, according to various embodiments of the disclosure.

When a user speech is input from the user, the electronic device 100 may perform speaker recognition using the user speech. When the user is confirmed to be a user using the electronic device 100 through the speaker recognition, the electronic device 100 may collect the user speech uttered by the user using the electronic device 100.

In addition, the electronic device 100 may obtain similarities between speeches of the respective users by comparing a speech feature for the speech of the user using the electronic device 100 with registered speech features for speeches of other users when the user using the electronic device 100 uses a speaker recognition service. In detail, the electronic device 100 may obtain speech feature information on the user speech. In this case, the electronic device 100 may obtain the speech feature information by analyzing frequency characteristics for each phoneme included in the user speech. In detail, the electronic device 100 may obtain frequency characteristics for each phoneme included in the user speech using a feature extraction technology such as cepstrum, linear predictive coefficient (LPC), mel frequency cepstral coefficient (MFCC), filter bank energy, or the like. In this case, the frequency characteristics for each phoneme may be expressed by a speech feature vector, and may be expressed by a multi-dimensional vector of a two-dimensional vector or more.

In addition, the electronic device 100 may obtain similarities by comparing speech feature information for each phoneme obtained for each of a plurality of users. In addition, the electronic device 100 may obtain phonemes having a high similarity difference among the similarities for the speech feature information for each phoneme to extract speaker feature information. That is, the electronic device 100 may compare speech feature information for each phoneme between users to exclude a speech having a high similarity, which does not reflect a feature of a speaker, and store a speech having a low similarity, which reflects the feature of the speaker, as the speaker feature information. In addition, the electronic device 100 may input speech feature information (that is, speech feature vectors) for each phoneme obtained for each of the plurality of users to a learned artificial intelligence model (for example, a deep neural network (DNN) model) to extract a speaker feature vector indicating a feature of the speaker. In this case, the speaker speech feature vector may be expressed as a multi-dimensional vector of a two-dimensional vector or more.

In addition, the electronic device 100 may assign a high weight to a phoneme of a portion having the largest similarity difference. In addition, when a similarity score of a large difference is continuously present in the same phoneme, the electronic device 100 may assign a high weight to the phoneme having the similarity score of the large difference.

Referring to FIG. 9A, in a case in which a text "yesterday" among texts included in a user speech 910 "play the drama that I watched yesterday" is distinguished from "yesterday" uttered by another user while the user utters the user speech 910 (that is, in a case in which a similarity score difference is a threshold value or more), the electronic device 100 may store information 915 on the text "yesterday" and information on a speech feature of the text in the memory 130.

In a case in which a new user is registered, the electronic device 100 may induce utterance of texts of speech features of existing users. That is, the electronic device 100 may compare and store the speech features of the existing users and a speech feature of the new user with each other to further enhance identification power of the speech features of the existing users.

The electronic device 100 may generate a question using a text having a speech feature stored in the memory 130 and distinguished from utterance of another user among texts uttered by the user using the electronic device 100.

Referring to FIG. 9B, the electronic device 100 may receive a user speech 920 "purchase an xx product".

The electronic device 100 may calculate a security score of the received user speech 920. In a case in which the security score of the user speech 920 is a third threshold value (for example, 2) or more, the electronic device 100 may ask a question for user confirmation. Particularly, in a case in which the security score is a fourth threshold value (for example, 3.5) or more requiring user authentication, the electronic device 100 may generate a question for the user authentication.

Particularly, the electronic device 100 may generate a question using a text having a speech feature distinguished between the user using the electronic device 100 and another user. For example, the electronic device 100 may generate a question 930 "authentication is performed. Speech password is "a friend that you met yesterday"" demanding utterance of "a friend that you met yesterday" using a text "yesterday", which is a text having a speech feature stored in the memory 130 and distinguished from another user. In this case, at least one other text as well as the text having the speech feature distinguished from another user may be included in the speech password. In addition, the question 930 including the speech password may be changed whenever the question is generated. As an example, various speech passwords including the text "yesterday", such as "a friend that you met yesterday", "yesterday weather", "a food that you ate yesterday, and the like may be generated. That is, whenever the question is generated, the speech password may be changed to prevent user authentication from being performed by a recorded speech.

In addition, when a user response 940 "friend that I met yesterday" is received, the electronic device 100 may compare a speech feature for "yesterday" included in the user response 940 with a pre-stored speech feature for "yesterday" to perform the user authentication. In a case in which a similarity between the speech feature for "yesterday" included in the user response 940 and the pre-stored speech feature for "yesterday" is a threshold value or more, the electronic device 100 may perform the user authentication and perform a task related to the user speech 920. In addition, the electronic device 100 may output a guide message 950 "authenticated", which is an authentication result.

According to the diverse embodiments of the disclosure as described above, the electronic device 100 may perform the user confirmation or the user authentication before performing the task corresponding to the user speech to prevent the task unintended by the user from being performed.

The electronic device 100 may perform the operation as described above using the artificial intelligence agent program stored in the electronic device 100, but this is only an example, and the electronic device 100 may perform the operation as described above in conjunction with the external server.

Hereinafter, examples of generating a question for user confirmation in conjunction with an external server will be described with reference to FIGS. 10 to 12.

Figure 10:
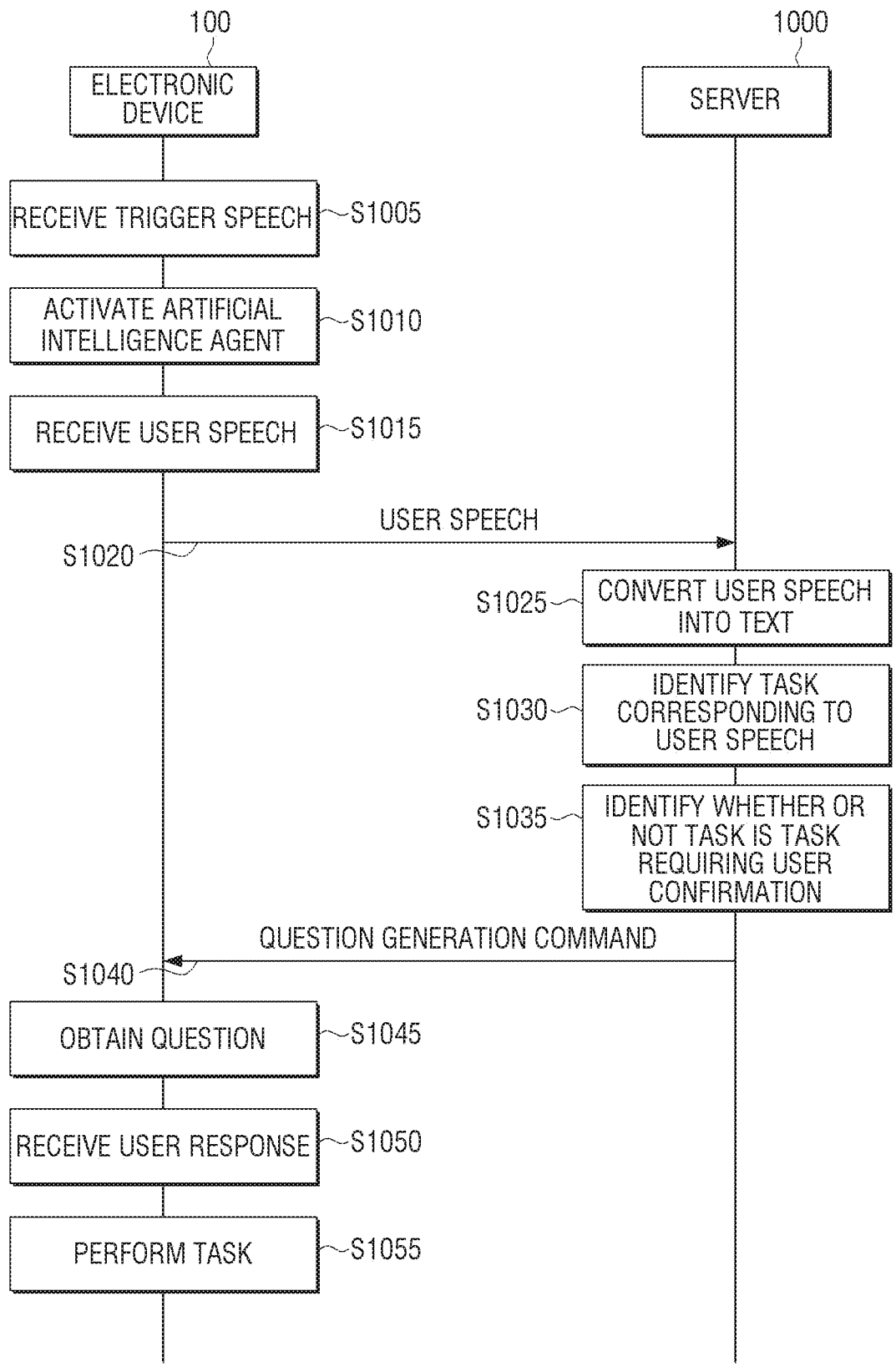
FIG. 10 is a sequence diagram illustrating an example of generating a question for user confirmation by an artificial intelligence system according to an embodiment of the disclosure.

FIG. 10 is a is a sequence diagram illustrating an example of generating a question for user confirmation by an artificial intelligence system according to an embodiment of the disclosure. In FIG. 10, a view is shown for describing an example in which an external server determines whether or not a task corresponding to a user speech is a task requiring user confirmation.

Referring to FIG. 10, the electronic device 100 may receive a trigger speech (S1005). In this case, the trigger speech may include a trigger word for executing the artificial intelligence agent program stored in the electronic device 100. According to another embodiment, to execute an artificial intelligence agent program for speech recognition, the electronic device 100 may receive a user command for selecting a specific button provided in the electronic device 100.

The electronic device 100 may activate the artificial intelligence agent in response (S1010) to the trigger speech. In this case, the artificial intelligence agent may be a virtual secretary for providing an interactive service to the user.

The electronic device 100 may receive the user speech (S1015). In this case, the user speech may include a text for performing a specific task.

The electronic device 100 may transmit the user speech to a server 1000 (S1020).

The server 1000 may convert the user speech into a text (S1025). In this case, the server 1000 may convert the user speech into the text using the automatic speech recognition (ASR) module.

The server 1000 may identify (determine) a task corresponding to the user speech (S1030). In detail, the server 1000 may analyze the user speech through the natural language understanding (NLU) module to determine the task corresponding to the user speech and the entity.

The server 1000 may identify (determine) whether or not the task corresponding to the user speech is the task requiring the user confirmation (S1035). That is, the server 1000 may determine whether or not the task corresponding to the user speech is the task related to the user privacy or requiring the security.

When it is determined that the task corresponding to the user speech is the task requiring the user confirmation, the server 1000 may transmit a question generation command to the electronic device 100 (S1040). In this case, the server 1000 may transmit information on the user speech together with the question generation command.

The electronic device 100 may obtain (generate) a question for the user confirmation in response to the question generation command (S1045). In this case, the question may be a task that is not related to the task corresponding to the user speech.

The electronic device 100 may receive a user response for the user question (S1050), and perform the task on the basis of the user response (S1055).

Figure 11:
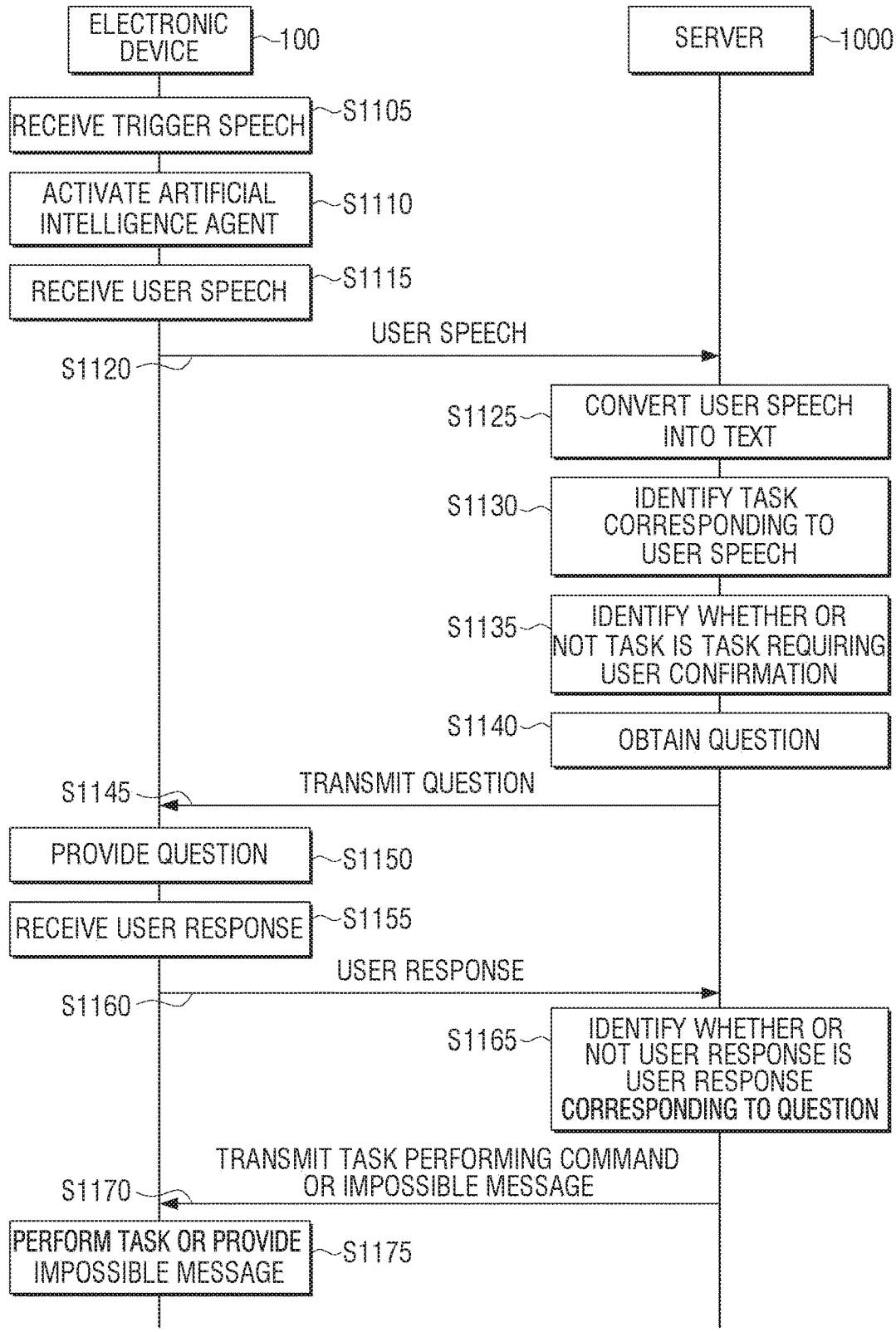
FIG. 11 is a sequence diagram illustrating another example of generating a question for user confirmation by an artificial intelligence system according to an embodiment of the disclosure.

FIG. 11 is a sequence diagram illustrating another example of generating a question for user confirmation by an artificial intelligence system according to an embodiment of the disclosure. In FIG. 11, a view is shown for describing an example in which the external server determines whether or not a task corresponding to a user speech is a task requiring user confirmation and generates a question.

Referring to FIG. 11, S1105, S1110, S1115, S1120, S1125, S1130 and S1135 of FIG. 11 correspond to S1005, S1010, S1015, S1020, S1025, S1030 and S1035 described in FIG. 10, and a detailed description thereof is thus omitted.

When it is identified (determined) that the task corresponding to the user speech is the task requiring the user confirmation, the server 1000 may obtain (generate) a question (S1140). In this case, the server 1000 may generate a question that is not related to the task corresponding to the user speech.

The server 1000 may transmit the question to the electronic device 100 (S1145).

The electronic device 100 may provide the question (S1150). In this case, the electronic device 100 may output the question in an audio form through the speaker 160, but this is only an example, and the electronic device 100 may output the question through the display 150.

The electronic device 100 may receive a user response (S1155), and transmit the received user response to the server 1000 (S1160).

The server 1000 may identify (determine) whether or not the user response received from the electronic device 100 is a user response corresponding to the question (S1165). When the user response received from the electronic device 100 is the user response corresponding to the question, the server 1000 may generate a task performing command (a guide message indicating a result of performing a task together with the task performing command). When the user response received from the electronic device 100 is not the user response corresponding to the question, the server 1000 may generate an impossible message including a message indicating that the task cannot be performed.

The server 1000 may transmit the task performing command or the impossible message to the electronic device 100 (S1170).

The electronic device 100 may perform the task on the basis of the task performing command or provide the impossible message (S1175).

Figure 12:
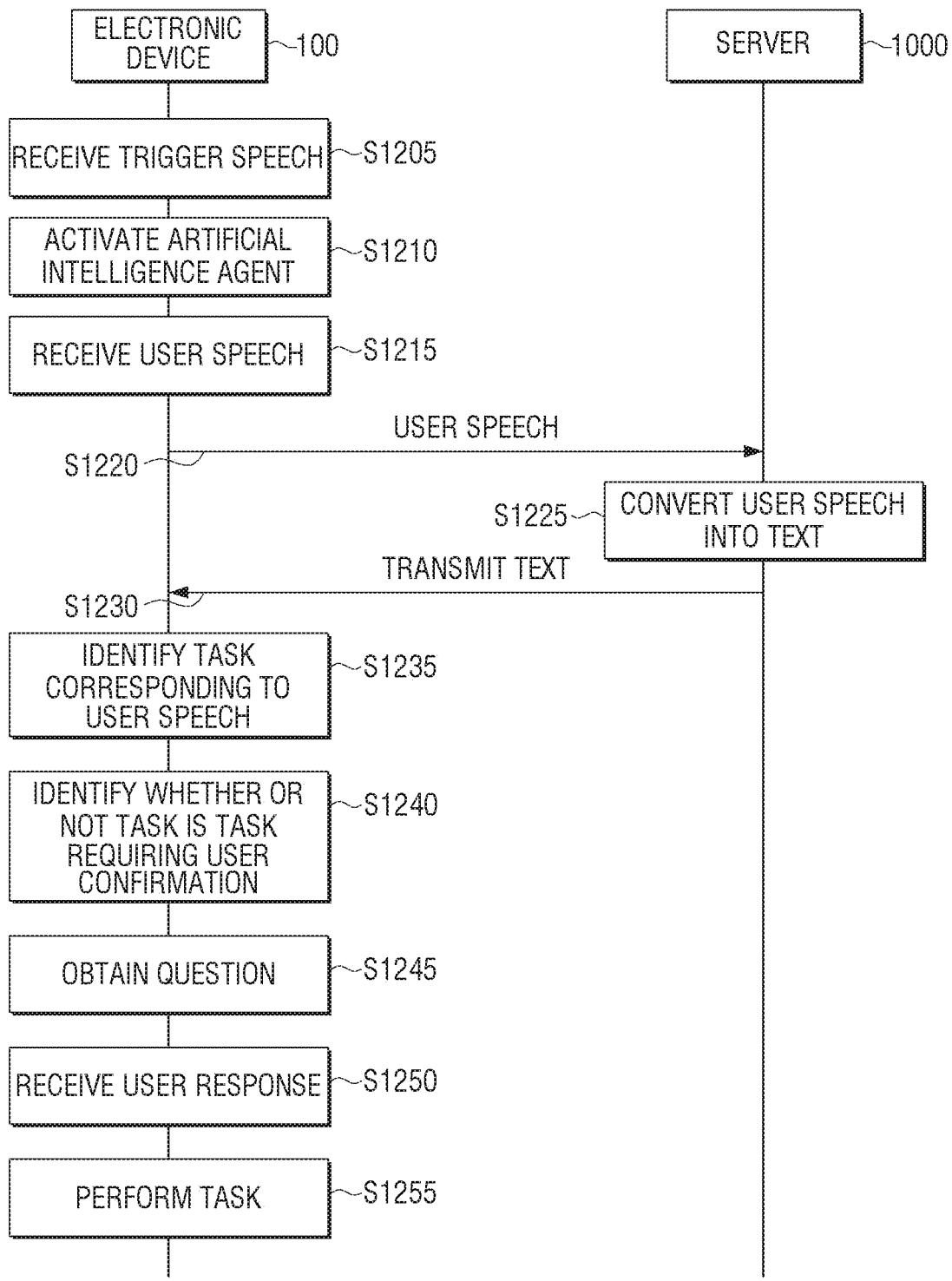
FIG. 12 is a sequence diagram illustrating another example of generating a question for user confirmation by an artificial intelligence system according to an embodiment of the disclosure.

FIG. 12 is a sequence diagram illustrating another example of generating a question for user confirmation by an artificial intelligence system according to an embodiment of the disclosure. In FIG. 12, a view is shown for describing an example in which the external server converts a user speech into a text.

Referring to FIG. 12, S1205, S1210, S1215, S1220 and S1225 of FIG. 12 correspond to S1005, S1010, S1015, S1020 and S1025 described in FIG. 10, and a detailed description thereof is thus omitted.

The server 1000 may transmit the obtained text to the electronic device 100 (S1230).

The electronic device 100 may identify (determine) a task corresponding to the user speech (S1235). In detail, the electronic device 100 may analyze the user speech through the natural language understanding (NLU) module to determine the task corresponding to the user speech and the entity.

The electronic device 100 may identify (determine) whether or not the task corresponding to the user speech is the task requiring the user confirmation (S1240). That is, the electronic device 100 may determine whether or not the task corresponding to the user speech is the task related to the user privacy or requiring the security.

When it is determined whether or not the task corresponding to the user speech is the task requiring the user confirmation, the electronic device 100 may obtain (generate) a question for the user confirmation in response to a question generation command (S1245). In this case, the question may be a task that is not related to the task corresponding to the user speech.

The electronic device 100 may receive a user response for the user question (S1250), and perform the task on the basis of the user response (S1255).

Figure 13:
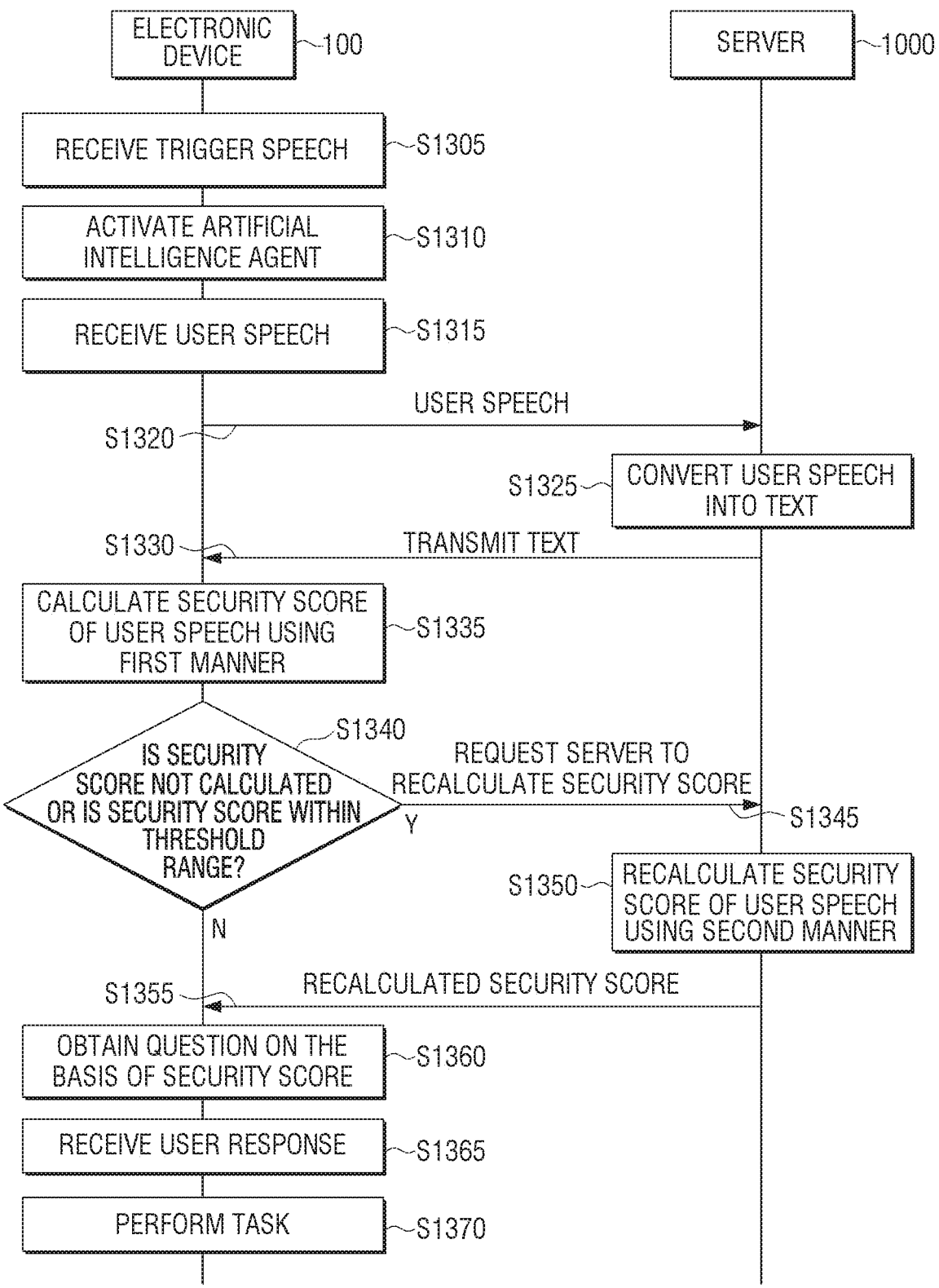
FIG. 13 is a sequence diagram for describing an example in which the electronic device or the external server converts a user speech into a text depending on a security score of the user speech, according to an embodiment of the disclosure.

FIG. 13 is a sequence diagram for describing an example in which the electronic device or the external server converts a user speech into a text depending on a security score of the user speech, according to an embodiment of the disclosure.

Referring to FIG. 13, S1305, S1310, S1315, S1320, S1325 and S1330 of FIG. 13 correspond to S1205, S1210, S1215, S1220, S1225 and S1230 illustrated in FIG. 12, and a detailed description thereof is thus omitted.

The electronic device 100 may calculate a security score of the user speech using a first manner on the basis of the obtained text (S1335). In this case, the first manner is a linear regression manner or a general rule-based lightweight manner. As an example, the security score of the user speech may be calculated in a manner as in Equation 1.

The electronic device 100 may determine whether or not the security score is not calculated or is within a threshold range (S1340). That is, in a case in which the task corresponding to the user speech or the entity may not be determined through the natural language understanding module present in the electronic device 100 or in a case in which the security score is within a threshold range (for example, 0.45 to 0.55) on the basis of a threshold range (for example, 0.5), the electronic device 100 may determine whether or not the security score is not calculated or is within the threshold range, to obtain an accurate security score through the external server 1000.

In a case in which the calculated security score is out of the threshold range, the electronic device 100 may obtain (generate) a question on the basis of the calculated security score (S1360). A method of generating the question using the security score has been described above, and a detailed description thereof is thus omitted.

In a case in which the security score is not calculated or the security score is within the threshold range, the electronic device 100 may request the server 1000 to recalculate the security score (S1345). In this case, the electronic device 100 may transmit text information corresponding to the user speech together with the request.

The server 100 may recalculate the security score of the user speech using a second manner (S1350). In this case, the second manner may be a manner of using an artificial intelligence model (for example, a DNN model) learned to calculate the security score of the user speech by inputting a text corresponding to the user speech. The server 1000 may transmit the recalculated security score to the electronic device 100 (S1355), and the electronic device 100 may obtain (generate) a question on the basis of the recalculated security score (S1360).

The electronic device 100 may receive a user response for the user question (S1365), and perform the task on the basis of the user response (S1370).

The electronic device 100 according to the diverse embodiments as described above may determine whether or not the task corresponding to the user speech is the task requiring the user confirmation and generate the question for the user confirmation on the basis of a determination result, in conjunction with the external server.

A case in which the server 1000 converts the user speech into the text has been described in FIG. 13, but this is only an example, and the user speech may be converted into the text through the ASR module 410 provided in the electronic device 100.

A case in which the user speech related to the task requiring the user confirmation is input once has been described in the embodiment described above, but this is only an example, and the user speech related to the task requiring the user confirmation may be continuously or periodically input.

In this case, the electronic device 100 may determine whether or not the user speech is input by the same user. In detail, in a case in which a second user speech is again input within a predetermined time after a session for user speech recognition starts by an input of a first user speech in a state in which the artificial intelligence agent is activated through the trigger speech, the electronic device 100 may determine whether or not the first user speech and the second user speech are speeches uttered by the same user. When the first user speech and the second user speech are input by the same user, the electronic device 100 may perform processing for the second user speech and maintain the session for the user speech recognition for a predetermined time. However, in a case in which the first user speech and the second user speech are not the speeches uttered by the same speaker, the electronic device 100 may not process the second user speech or may provide a rejection response. When a user speech is not input by the same user within a predetermined time, the electronic device 100 may end the session for the user speech recognition.

In addition, the electronic device 100 may compare a security score for the first user speech and a security score for the second user speech with each other. In a case in which the security score for the second user speech is higher than the security score for the first user speech, the electronic device 100 may generate a question for additional confirmation (or additional authentication) for the second user speech. As an example, the electronic device 100 may generate a question inducing utterance of a sentence or a word including a text having a speech feature distinguished from that of another user. In addition, the electronic device 100 may perform user authentication using data temporarily accumulated in real time while the session for the user speech recognition is maintained.

Terms "~er/or" or "module" used in the disclosure may include units configured by hardware, software, or firmware, and may be used compatibly with terms such as, for example, logics, logic blocks, components, circuits, or the like. The term "~er/or" or "module" may be an integrally configured component or a minimum unit performing one or more functions or a part thereof. For example, the module may be configured by an application-specific integrated circuit (ASIC).

The diverse embodiments of the disclosure may be implemented by software including instructions stored in a machine-readable storage medium (for example, a computer-readable storage medium). A machine may be a device that invokes the stored instruction from the storage medium and may be operated depending on the invoked instruction, and may include the electronic device (for example, the electronic device 100) according to the disclosed embodiments. In a case where a command is executed by the processor, the processor may directly perform a function corresponding to the command or other components may perform the function corresponding to the command under a control of the processor. The command may include codes created or executed by a compiler or an interpreter. The machine-readable storage medium may be provided in a form of a non-transitory storage medium. Here, the term 'non-transitory' means that the storage medium is tangible without including a signal, and does not distinguish whether data are semi-permanently or temporarily stored in the storage medium.

According to an embodiment, the methods according to the diverse embodiments disclosed in the document may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In a case of the online distribution, at least portions of the computer program product may be at least temporarily stored in a storage medium such as a memory of a server of a manufacturer, a server of an application store, or a relay server or be temporarily created.

Each of the components (for example, modules or programs) according to the diverse embodiments may include a single entity or a plurality of entities, and some of the corresponding sub-components described above may be omitted or other sub-components may be further included in the diverse embodiments. Alternatively or additionally, some of the components (for example, the modules or the programs) may be integrated into one entity, and may perform functions performed by the respective corresponding components before being integrated in the same or similar manner. Operations performed by the modules, the programs, or the other components according to the diverse embodiments may be executed in a sequential manner, a parallel manner, an iterative manner, or a heuristic manner, at least some of the operations may be performed in a different order or be omitted, operations may be combined, or other operations may be added.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. An electronic device comprising:
    an input interface;
    a communication interface;
    a memory including at least one command; and
    at least one processor connected to the input interface, the communication interface, and the memory and configured to control the electronic device,
    wherein the at least one processor executes the at least one command to be configured to:
        receive a user speech through the input interface,
        identify whether or not the user speech is a speech related to a task requiring a user authorization by analyzing the user speech,
        obtain information on at least one of a place where the electronic device is placed or information on whether another person is present around the electronic device based on determination that the user speech is the speech related to the task requiring the user authorization,
        obtain a question unrelated to personal information for the user authorization based on the obtained information on at least one of a place where the electronic device is placed or information on whether another person is present around the electronic device, and
        perform the task corresponding to the user speech based on a user response corresponding to the question being inputted through the input interface.

2. The electronic device as claimed in claim 1, wherein the at least one processor executes the at least one command to be further configured to:
    identify a volume of a sound except the user speech being higher than a reference volume based on determination that the user speech is the speech related to the task requiring the user authorization,
    obtain information on at least one of a place where the electronic device is placed or information on whether another person is present around the electronic device based on the identified volume of the sound except the user speech being higher than the reference volume.

3. The electronic device as claimed in claim 1, wherein the at least one processor executes the at least one command to be further configured to:
provide an authentication message for user authentication based on the task being related to a privacy or a security.

4. The electronic device as claimed in claim 1, wherein the at least one processor executes the at least one command to be further configured to:
extract at least one of texts included in the user speech, and
obtain a question for inducing user utterance for the extracted at least one text.

5. The electronic device as claimed in claim 1, wherein the at least one processor executes the at least one command to be further configured to:
obtain speech feature information on a text distinguished from that of another user by analyzing a speech of a user using the electronic device, and
store the speech feature information in the memory.

6. The electronic device as claimed in claim 5, wherein the at least one processor executes the at least one command to be further configured to:
obtain a question including a stored text based on determination that the user speech is the speech related to the task requiring the user authorization, and
perform the task corresponding to the user speech based on the speech feature information on the text being obtained in the user response.

7. The electronic device as claimed in claim 1, wherein the task requiring the user authorization comprises at least one of a remittance task, a product purchase task, an email transmission task, a message transmission task, or a telephone call task.

8. A control method of an electronic device, comprising:
receiving a user speech;
identifying whether or not the user speech is a speech related to a task requiring a user authorization by analyzing the user speech;
obtaining information on at least one of a place where the electronic device is placed or information on whether another person is present around the electronic device based on determination that the user speech is the speech related to the task requiring the user authorization;
obtaining a question unrelated to personal information for the user authorization based on the obtained information on at least one of a place where the electronic device is placed or information on whether another person is present around the electronic device; and
performing the task corresponding to the user speech based on a user response corresponding to the question being inputted.

9. The control method as claimed in claim 8, wherein an authentication message for user authentication is provided based on the task being related to a privacy or a security.

10. The control method as claimed in claim 8, wherein at least one of texts included in the user speech is extracted and a question for inducing user utterance for the extracted at least one text is generated.

11. The control method as claimed in claim 8, further comprising:
obtaining speech feature information on a text distinguished from that of another user by analyzing a speech of a user using the electronic device; and
storing the speech feature information.

12. The control method as claimed in claim 11,
wherein a question including a stored text is generated based on determination that the user speech is the speech related to the task requiring the user authorization, and
wherein the task corresponding to the user speech is performed based on the speech feature information on the text being obtained in the user response.

13. The control method as claimed in claim 8, wherein the task requiring the user authorization comprises at least one of a remittance task, a product purchase task, an email transmission task, a message transmission task, or a telephone call task.

14. The control method as claimed in claim 8, further comprising:
identifying a volume of a sound except the user speech being higher than a reference volume based on determination that the user speech is the speech related to the task requiring the user authorization,
obtaining information on at least one of a place where the electronic device is placed or information on whether another person is present around the electronic device based on the identified volume of the sound except the user speech being higher than the reference volume.

* * * * *